(12) United States Patent
Lewis

(10) Patent No.: US 12,566,923 B1
(45) Date of Patent: Mar. 3, 2026

(54) SYSTEMS AND METHODS FOR TRAINING AND USING CUSTOM VECTOR EMBEDDING MODELS

(71) Applicant: Geotab Inc., Oakville (CA)

(72) Inventor: Daniel J. Lewis, Cambridge (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 19/278,917

(22) Filed: Jul. 24, 2025

Related U.S. Application Data

(60) Provisional application No. 63/842,263, filed on Jul. 11, 2025.

(51) Int. Cl.
| | |
|---|---|
| G06F 40/30 | (2020.01) |
| G06F 40/284 | (2020.01) |
| G06F 40/40 | (2020.01) |
| G06N 3/08 | (2023.01) |
| G06F 16/3329 | (2025.01) |
| G06F 40/56 | (2020.01) |
| G06N 3/0475 | (2023.01) |
| G06N 20/00 | (2019.01) |

(Continued)

(52) U.S. Cl.
CPC ............. G06F 40/30 (2020.01); G06F 40/284 (2020.01); G06F 40/40 (2020.01); G06N 3/08 (2013.01); *G06F 16/3329* (2019.01); *G06F 40/56* (2020.01); *G06N 3/0475* (2023.01); *G06N 20/00* (2019.01); *G10L 15/1815* (2013.01); *G10L 15/22* (2013.01)

(58) Field of Classification Search
CPC ........ G06F 40/30; G06F 40/284; G06F 40/40; G06F 40/35; G06F 40/211; G06F 40/289; G06F 40/56; G06F 40/20; G06F 40/216; G06F 40/247; G06F 40/295; G06F 40/44; G06F 16/3329; G06F 16/24522; G06F 16/3344; G06F 16/90332; G06F 16/3347; G06F 16/22; G06F 16/24534; G06F 16/24564; G06F 16/24573; G06F 16/243; G06F 16/2455; G10L 15/1815; G10L 15/16; G10L 15/1822; G10L 15/197; G10L 15/26; G10L 15/22
USPC .......................................................... 704/9
See application file for complete search history.

(56) References Cited

U.S. PATENT DOCUMENTS

| | | | | |
|---|---|---|---|---|
| 10,699,564 B1 * | 6/2020 | Lewis | .................... | G07C 5/085 |
| 2020/0251100 A1 * | 8/2020 | Tan | ........................ | G06N 3/096 |

(Continued)

*Primary Examiner* — Vijay B Chawan
(74) *Attorney, Agent, or Firm* — Lawrence Xin-Tao Yu

(57) ABSTRACT

Systems and methods for training and using custom vector embedding models are provided. The systems and methods involve operating at least one processor to: receive a plurality of example user questions containing domain-specific language; use a large language model to create a plurality of synthetic variant questions based on the plurality of the example user questions; generate a plurality of similar question pairs; use the large language model to assign a plurality of topics to the plurality of example user questions and the plurality of synthetic variant questions; generate a plurality of dissimilar question pairs; determine, using a default vector embedding model, default vector embeddings for each similar question pair and each dissimilar question pair; and train the custom vector embedding model based on differences between the default vector embeddings of each similar question pair and each dissimilar question pair.

21 Claims, 14 Drawing Sheets

(51) Int. Cl.
　　*G10L 15/18*　　　　(2013.01)
　　*G10L 15/22*　　　　(2006.01)

(56)　　　　　　　　References Cited

U.S. PATENT DOCUMENTS

| | | | |
|---|---|---|---|
| 2022/0093088 A1* | 3/2022 | Rangarajan Sridhar ..................... | |
| | | | G06F 16/338 |
| 2022/0138433 A1* | 5/2022 | Divakaran .......... | G06F 16/3335 |
| | | | 704/9 |
| 2022/0188661 A1* | 6/2022 | Tappin .................. | G06F 16/248 |
| 2023/0306284 A1* | 9/2023 | Tappin .................. | G06F 16/248 |
| 2024/0095460 A1* | 3/2024 | Xu .......................... | G06F 40/30 |
| 2024/0111794 A1* | 4/2024 | Osuala ................ | G06F 16/3323 |
| 2024/0356874 A1* | 10/2024 | Medalion ............... | G06F 40/20 |
| 2024/0362213 A1* | 10/2024 | Grenader .......... | G06F 16/24573 |
| 2024/0362497 A1* | 10/2024 | Grenader ............. | G06N 3/0455 |
| 2025/0021547 A1* | 1/2025 | Lewis ................... | G06F 16/285 |
| 2025/0053517 A1* | 2/2025 | Daily .................... | G06F 9/5066 |
| 2025/0097171 A1* | 3/2025 | Hu ........................... | G06F 8/35 |
| 2025/0117666 A1* | 4/2025 | Brenner ................ | G06N 3/091 |
| 2025/0181899 A1* | 6/2025 | Ajmera ............... | G06N 3/0475 |
| 2025/0190454 A1* | 6/2025 | Patil .................... | G06F 16/3326 |
| 2025/0245445 A1* | 7/2025 | Hitesh .................. | G06F 40/295 |
| 2025/0252111 A1* | 8/2025 | Aggarwal ......... | G06F 16/24578 |
| 2025/0259075 A1* | 8/2025 | Crabtree ............... | G06N 3/092 |
| 2025/0259096 A1* | 8/2025 | Kotaru .................. | G06N 20/00 |
| 2025/0265306 A1* | 8/2025 | Toshniwal ............. | G06F 17/11 |
| 2025/0285012 A1* | 9/2025 | Blair ..................... | G06N 20/00 |

* cited by examiner

1900

1902
RECEIVE USER QUESTION

1904
DETERMINE DEFAULT VECTOR EMBEDDING

1906
DETERMINE CUSTOM VECTOR EMBEDDING

1908
RETRIEVE CONTEXTUAL DATA

1910
GENERATE CONTEXTUALIZED PROMPT

1912
PROMPT LARGE LANGUAGE MODEL

1914
PROVIDE RESPONSE TO USER

2100

| Internet Browser | - □ ✕ |
|---|---|

← → ↻ | https://my.geotab.com/

Fleet Manager Application

What is GPS top speed in each zone?

| Zone Name | Zone Id | Top Speed Mph |
|---|---|---|
| Alpha Zone | A7YJ2P9B | 147.85 |
| Sector One | X4R1FG8Q | 131.09 |
| Growth Hub | C9K3ZT6M | 125.61 |
| Summit Point | 2B5H7L1W | 110.37 |
| Nexus Core | E0U6N4OD | 103.92 |
| Central Block | V8P3QJ5S | 94.50 |
| Mainframe Park | F1W9X0C2 | 88.16 |
| Gateway District | D6M2G7R8 | 72.03 |
| Pinnacle Site | T5Z4N3Y9 | 65.78 |
| Enterprise Node | L0K8C1PX | 51.24 |

I analyzed GPS data from the past week to find the top speed recorded in each zone I used data from GPS logs table, which contains GPS coordinates and speed recordings for all active devices. I also used the Zones table to determine the geographic boundaries of each zone. I converted speed from kilometers per hour to miles per hour, and then determined the maximum speed recorded within each zone's boundaries during the last week.

v Show SQL                                                      ⇩ Download  ⧉ b p ⓘ AI generated content may not be accurate or suitable for every context Ask your question here.                                                      ⇨

FIG. 21

SYSTEMS AND METHODS FOR TRAINING AND USING CUSTOM VECTOR EMBEDDING MODELS

CROSS-REFERENCE TO RELATED APPLICATIONS

This application claims priority to U.S. Provisional Patent Application No. 63/842,263 filed Jul. 11, 2025 and titled "SYSTEMS AND METHODS FOR TRAINING AND USING CUSTOM VECTOR EMBEDDING MODELS" the contents of which are incorporated herein by reference for all purposes.

FIELD

The embodiments described herein generally relate to vector embeddings for large language models, and in particular, to custom vector embedding models.

BACKGROUND

The following is not an admission that anything discussed below is part of the prior art or part of the common general knowledge of a person skilled in the art.

Large language models are a type of machine learning model that can perform natural language processing tasks, such as language generation. Generative pretrained transformers are one example of a large language model. Commercial examples of large language models include Google Gemini™, OpenAI ChatGPT™, Meta Llama™, and Deep-Seek™. Although large language models excel at general language tasks, they often struggle to interpret and apply domain-specific language.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with a broad aspect, there is provided a method for training a custom vector embedding model. The method involves operating at least one processor to: receive a plurality of example user questions containing domain-specific language; use a large language model to create a plurality of synthetic variant questions based on the plurality of the example user questions, each synthetic variant question corresponding to an example user question; generate a plurality of similar question pairs using the plurality of example user questions and the plurality of synthetic variant questions; use the large language model to assign a plurality of topics to the plurality of example user questions and the plurality of synthetic variant questions, at least one topic being assigned to each example user question and each synthetic variant question; generate a plurality of dissimilar question pairs using the plurality of example user questions, the plurality of synthetic variant questions, and the plurality of topics, each dissimilar question pair having no topics in common; determine, using a default vector embedding model, default vector embeddings for each similar question pair and each dissimilar question pair; and train the custom vector embedding model based on differences between the default vector embeddings of each similar question pair and each dissimilar question pair, whereby the custom vector embedding model is operable to reproject default vector embeddings into a custom vector embedding space suitable for representing the domain-specific language.

In some embodiments, the custom vector embedding model can be trained to maximize the differences between the default vector embeddings of each dissimilar question pair and minimize the differences between the default vector embeddings of each similar question pair.

In some embodiments, the custom vector embedding model can be trained based on clusterability of the plurality of dissimilar question pairs and the plurality of similar question pairs in the custom vector embedding space.

In some embodiments, the custom vector embedding model can be trained based on distribution uniformity of the plurality of dissimilar question pairs and the plurality of similar question pairs in the custom vector embedding space.

In some embodiments, the method can further involve operating the at least one processor to: determine a contrastive loss, a uniformity loss, and/or a density loss of the plurality of similar question pairs and the plurality of dissimilar question pairs based on the respective default vector embeddings; and the custom vector embedding model can be trained based on the contrastive loss, the uniformity loss, and/or the density loss.

In some embodiments, a majority of dissimilar question pairs can be further apart in the custom vector embedding space of the custom vector embedding model than in a default vector embedding space of the default vector embedding model; and a majority of similar question pairs can be closer together in the custom vector embedding space of the custom vector embedding model than in the default vector embedding space of the default vector embedding model.

In some embodiments, the method can further involve operating the at least one processor to: define a plurality of clusters in the custom vector embedding space; use the large language model to assign a plurality of cluster topics to the plurality of clusters, each cluster being assigned at least one cluster topic; and retrain the custom vector embedding model by adjusting at least one hyperparameter of the custom vector embedding model based on the plurality of clusters and the plurality of cluster topics.

In some embodiments, each synthetic variant question can include at least one variation from the corresponding example user question, the variation can include at least one of: a conceptual variation, an entity variation, a grammatical variation, a linguistic variation, a numerical variation, a specificity variation and/or a temporal variation.

In some embodiments, at least two synthetic variant questions corresponding to the same example user question can relate to two different fields stored in a common database table.

In some embodiments, at least one similar question pair can include: an example user question and a synthetic variant question corresponding to the example user question, or two synthetic variant questions corresponding to the same example user question.

In some embodiments, at least one dissimilar question pair can include: two example user questions with no common topics, an example user question and a synthetic variant question with no common topics, or two synthetic variant questions with no common topics.

In some embodiments, the domain-specific language can include terminology relating to telematics and the plurality of example user questions can include questions relating to telematics data originating from a plurality of telematics devices installed in a plurality of vehicles.

In some embodiments, the custom vector embedding model can include a neural network.

In some embodiments, the method can further involve operating the at least one processor to: receive a user question containing the domain-specific language; determine, using the default vector embedding model, a default vector embedding for the user question; determine, using the custom vector embedding model, a custom vector embedding for the user question based on the default vector embedding; retrieve, based on the custom vector embedding, contextual data associated with the user question; generate a contextualized prompt for the large language model using the user question and the contextual data; prompt the large language model using the contextualized prompt to generate a response to the user question; and provide at least a portion of the response generated by the large language model to the user.

In accordance with a broad aspect, there is provided a system for training a custom vector embedding model. The system includes at least one data storage and at least one processor in communication with the at least one data storage. The at least one data storage is operable to store a plurality of example user questions containing domain-specific language. The at least one processor is operable to: use a large language model to create a plurality of synthetic variant questions based on the plurality of the example user questions, each synthetic variant question corresponding to an example user question; generate a plurality of similar question pairs using the plurality of example user questions and the plurality of synthetic variant questions; use the large language model to assign a plurality of topics to the plurality of example user questions and the plurality of synthetic variant questions, at least one topic being assigned to each example user question and each synthetic variant question; generate a plurality of dissimilar question pairs using the plurality of example user questions, the plurality of synthetic variant questions, and the plurality of topics, each dissimilar question pair having no topics in common; determine, using a default vector embedding model, default vector embeddings for each similar question pair and each dissimilar question pair; and train the custom vector embedding model based on differences between the default vector embeddings of each similar question pair and each dissimilar question pair, whereby the custom vector embedding model is operable to reproject default vector embeddings into a custom vector embedding space suitable for representing the domain-specific language.

In some embodiments, the custom vector embedding model can be trained to maximize the differences between the default vector embeddings of each dissimilar question pair and minimize the differences between the default vector embeddings of each similar question pair.

In some embodiments, the custom vector embedding model can be trained based on clusterability of the plurality of dissimilar question pairs and the plurality of similar question pairs in the custom vector embedding space.

In some embodiments, the custom vector embedding model can be trained based on distribution uniformity of the plurality of dissimilar question pairs and the plurality of similar question pairs in the custom vector embedding space.

In some embodiments, the at least one processor can be further operable to: determine a contrastive loss, a uniformity loss, and/or a density loss of the plurality of similar question pairs and the plurality of dissimilar question pairs based on the respective default vector embeddings; and the custom vector embedding model can be trained based on the contrastive loss, the uniformity loss, and/or the density loss.

In some embodiments, a majority of dissimilar question pairs can be further apart in the custom vector embedding space of the custom vector embedding model than in a default vector embedding space of the default vector embedding model; and a majority of similar question pairs can be closer together in the custom vector embedding space of the custom vector embedding model than in the default vector embedding space of the default vector embedding model.

In some embodiments, the at least one processor can be further operable to: define a plurality of clusters in the custom vector embedding space; use the large language model to assign a plurality of cluster topics to the plurality of clusters, each cluster being assigned at least one cluster topic; and retrain the custom vector embedding model by adjusting at least one hyperparameter of the custom vector embedding model based on the plurality of clusters and the plurality of cluster topics.

In some embodiments, each synthetic variant question can include at least one variation from the corresponding example user question, the variation can include at least one of: a conceptual variation, an entity variation, a grammatical variation, a linguistic variation, a numerical variation, a specificity variation and/or a temporal variation.

In some embodiments, at least two synthetic variant questions corresponding to the same example user question can relate to two different fields stored in a common database table.

In some embodiments, at least one similar question pair can include: an example user question and a synthetic variant question corresponding to the example user question, or two synthetic variant questions corresponding to the same example user question.

In some embodiments, at least one dissimilar question pair can include: two example user questions with no common topics, an example user question and a synthetic variant question with no common topics, or two synthetic variant questions with no common topics.

In some embodiments, the domain-specific language can include terminology relating to telematics and the plurality of example user questions can include questions relating to telematics data originating from a plurality of telematics devices installed in a plurality of vehicles.

In some embodiments, the custom vector embedding model can include a neural network.

In some embodiments, the at least one processor can be further operable to: receive a user question containing the domain-specific language; determine, using the default vector embedding model, a default vector embedding for the user question; determine, using the custom vector embedding model, a custom vector embedding for the user question based on the default vector embedding; retrieve, based on the custom vector embedding, contextual data associated with the user question; generate a contextualized prompt for the large language model using the user question and the contextual data; prompt the large language model using the contextualized prompt to generate a response to the user question; and provide at least a portion of the response generated by the large language model to the user.

In accordance with a broad aspect, there is provided a method for using a custom vector embedding model. The method involves operating at least one processor to: receive a user question containing domain-specific language; determine, using a default vector embedding model, a default vector embedding for the user question; determine, using a custom vector embedding model, a custom vector embedding for the user question based on the default vector embedding, the custom vector embedding model trained to reproject default vector embeddings into a custom vector embedding space suitable for representing the domain-specific language using a plurality of synthetic variant questions generated by a large language model; retrieve, based on the custom vector embedding, contextual data associated with the user question; generate a contextualized prompt for the large language model using the user question and the contextual data; prompt the large language model using the contextualized prompt to generate a response to the user question; and provide at least a portion of the response generated by the large language model to the user, whereby the user question containing the domain-specific language is responded to without tuning the default vector embedding model.

In some embodiments, the method further involves operating the at least one processor to: identify, from a plurality of custom vector embeddings for a plurality of contextual data, at least one custom vector embedding similar to the custom vector embedding for the user question; and the contextual data can be retrieved based on the at least one custom vector embedding.

In some embodiments, identifying the at least one custom vector embedding can involve: maximizing similarity to the custom vector embedding while minimizing similarity between each custom vector embedding in the at least one custom vector.

In some embodiments, the response can include an executable database query for retrieving data related to the user question and the method can further involve operating the at least one processor to execute the executable database query to retrieve the data and provide at least a portion of the retrieved data.

In some embodiments, the contextual data can include at least one example executable database query corresponding to the user question.

In some embodiments, the domain-specific language can include telematics terminology and the user question can relate to telematics data originating from at least one telematics device installed in at least one vehicle.

In some embodiments, the response can include an executable database query for retrieving the telematics data.

In some embodiments, the custom vector embedding model can include a neural network.

In some embodiments, each synthetic variant question can include at least one variation from a corresponding example user question, the variation can include at least one of: a conceptual variation, an entity variation, a grammatical variation, a linguistic variation, a numerical variation, a specificity variation and/or a temporal variation.

In some embodiments, the custom vector embedding model can be trained using a plurality of similar question pairs and a plurality of dissimilar question pairs.

In some embodiments, the custom vector embedding model can be trained based on a contrastive loss, a uniformity loss, and/or a density loss of the plurality of similar question pairs and the plurality of dissimilar question pairs.

In accordance with a broad aspect, there is provided a system for using a custom vector embedding model. The system includes at least one data storage and at least one processor in communication with the at least one data storage. The at least one data storage is operable to store the custom vector embedding model. The at least one processor operable to: receive a user question containing domain-specific language; determine, using a default vector embedding model, a default vector embedding for the user question; determine, using a custom vector embedding model, a custom vector embedding for the user question based on the default vector embedding, the custom vector embedding model trained to reproject default vector embeddings into a custom vector embedding space suitable for representing the domain-specific language using a plurality of synthetic variant questions generated by a large language model; retrieve, based on the custom vector embedding, contextual data associated with the user question; generate a contextualized prompt for the large language model using the user question and the contextual data; prompt the large language model using the contextualized prompt to generate a response to the user question; and provide at least a portion of the response generated by the large language model to the user, whereby the user question containing the domain-specific language is responded to without tuning the default vector embedding model.

In some embodiments, the at least one processor can be further operable to: identify, from a plurality of custom vector embeddings for a plurality of contextual data, at least one custom vector embedding similar to the custom vector embedding for the user question; and the contextual data is retrieved based on the at least one custom vector embedding.

In some embodiments, identifying the at least one custom vector embedding can involve: maximizing similarity to the custom vector embedding while minimizing similarity between each custom vector embedding in the at least one custom vector.

In some embodiments, the response can include an executable database query for retrieving data related to the user question and the method can further involve operating the at least one processor to execute the executable database query to retrieve the data and provide at least a portion of the retrieved data.

In some embodiments, the contextual data can include at least one example executable database query corresponding to the user question.

In some embodiments, the domain-specific language can include telematics terminology and the user question can relate to telematics data originating from at least one telematics device installed in at least one vehicle.

In some embodiments, the response can include an executable database query for retrieving the telematics data.

In some embodiments, the custom vector embedding model can include a neural network.

In some embodiments, each synthetic variant question can include at least one variation from a corresponding example user question, the variation can include at least one of: a conceptual variation, an entity variation, a grammatical variation, a linguistic variation, a numerical variation, a specificity variation and/or a temporal variation.

In some embodiments, the custom vector embedding model can be trained using a plurality of similar question pairs and a plurality of dissimilar question pairs.

In some embodiments, the custom vector embedding model can be trained based on a contrastive loss, a uniformity loss, and/or a density loss of the plurality of similar question pairs and the plurality of dissimilar question pairs.

In accordance with a broad aspect, there is provided a method for using a custom vector embedding model, the method involving operating at least one processor to: receive, at an initial sequence block, a default vector embedding for a user question containing domain-specific language and reduce a dimensionality of the default vector embedding to generate a reduced default vector embedding; reproject, at a residual block, the reduced default vector embedding to generate a reprojected reduced default vector embedding; and restore, at an output sequential block, a dimensionality of the reprojected reduced default vector embedding to output a custom vector embedding; and the initial sequence block, residual block, and output sequential block are trained to reproject default vector embeddings into a custom vector embedding space suitable for representing the domain-specific language using a plurality of synthetic variant questions.

In some embodiments, the method can further involve operating the at least one processor to: bypass at least a portion of the initial sequence block using at least one residual connection between the initial sequence block and the residual block.

In some embodiments, the custom vector embedding model can be a neural network, and the initial sequence block, the residual block, and the output sequential block can include a plurality of layers in the neural network.

In some embodiments, the initial sequence block, the residual block, and the output sequential block can be trained using a plurality of similar question pairs and a plurality of dissimilar question pairs.

In some embodiments, the initial sequence block, the residual block, and the output sequential block can be trained based on a contrastive loss, a uniformity loss, and/or a density loss of the plurality of similar question pairs and the plurality of dissimilar question pairs.

In some embodiments, a majority of dissimilar question pairs can be further apart in the custom vector embedding space of the custom vector embedding model than in a default vector embedding space of a default vector embedding model corresponding to the default vector embedding; and a majority of similar question pairs can be closer together in the custom vector embedding space of the custom vector embedding model than in the default vector embedding space of the default vector embedding model.

In some embodiments, each synthetic variant question can include at least one variation from a corresponding example user question, the variation can include at least one of: a conceptual variation, an entity variation, a grammatical variation, a linguistic variation, a numerical variation, a specificity variation and/or a temporal variation.

In some embodiments, the domain-specific language can include telematics terminology and the user question can relate to telematics data originating from at least one telematics device installed in at least one vehicle.

In some embodiments, the custom vector embedding can include an array of numbers, each number representing a strength of association with at least one semantic concept.

In some embodiments, the custom vector embedding model can be a neural network, and the initial sequence block, the residual block, and the output sequential block can include at least one linear transformation layer, at least one hyperbolic tangent layer, at least one layer normalization layer, and/or at least one parametric rectified linear unit activation layer.

In accordance with a broad aspect, there is provided a system for using a custom vector embedding model. The system includes at least one data storage and at least one processor in communication with the at least one data storage. The at least one data storage is operable to store the custom vector embedding model. The at least one processor is operable to: receive, at an initial sequence block, a default vector embedding for a user question containing domain-specific language and reduce a dimensionality of the default vector embedding to generate a reduced default vector embedding; reproject, at a residual block, the reduced default vector embedding to generate a reprojected reduced default vector embedding; and restore, at an output sequential block, a dimensionality of the reprojected reduced default vector embedding to output a custom vector embedding; and the initial sequence block, residual block, and output sequential block are trained to reproject default vector embeddings into a custom vector embedding space suitable for representing the domain-specific language using a plurality of synthetic variant questions.

In some embodiments, the at least one processor can be further operable to: bypass at least a portion of the initial sequence block using at least one residual connection between the initial sequence block and the residual block.

In some embodiments, the custom vector embedding model can be a neural network, and the initial sequence block, the residual block, and the output sequential block can include a plurality of layers in the neural network.

In some embodiments, the initial sequence block, the residual block, and the output sequential block can be trained using a plurality of similar question pairs and a plurality of dissimilar question pairs.

In some embodiments, the initial sequence block, the residual block, and the output sequential block can be trained based on a contrastive loss, a uniformity loss, and/or a density loss of the plurality of similar question pairs and the plurality of dissimilar question pairs.

In some embodiments, a majority of dissimilar question pairs can be further apart in the custom vector embedding space of the custom vector embedding model than in a default vector embedding space of a default vector embedding model corresponding to the default vector embedding; and a majority of similar question pairs can be closer together in the custom vector embedding space of the custom vector embedding model than in the default vector embedding space of the default vector embedding model.

In some embodiments, each synthetic variant question can include at least one variation from a corresponding example user question, the variation can include at least one of: a conceptual variation, an entity variation, a grammatical variation, a linguistic variation, a numerical variation, a specificity variation and/or a temporal variation.

In some embodiments, the domain-specific language can include telematics terminology and the user question can relate to telematics data originating from at least one telematics device installed in at least one vehicle.

In some embodiments, the custom vector embedding can include an array of numbers, each number representing a strength of association with at least one semantic concept.

In some embodiments, the custom vector embedding model can include a neural network, and the initial sequence block, the residual block, and the output sequential block can include at least one linear transformation layer, at least one hyperbolic tangent layer, at least one layer normalization layer, and/or at least one parametric rectified linear unit activation layer.

In accordance with a broad aspect, there is provided a custom vector embedding model including: an initial sequence block operable to receive a default vector embedding for a user question containing domain-specific language and reduce a dimensionality of the default vector embedding to generate a reduced default vector embedding; a residual block operable to reproject the reduced default vector embedding to generate a reprojected reduced default vector embedding; and an output sequential block operable to restore a dimensionality of the reprojected reduced default vector embedding to output a custom vector embedding; and the initial sequence block, residual block, and output sequential block are trained to reproject default vector embeddings into a custom vector embedding space suitable for representing the domain-specific language using a plurality of synthetic variant questions.

In some embodiments, the custom vector embedding model can further include: at least one residual connection between the initial sequence block and the residual block operable to bypass at least a portion of the initial sequence block.

In some embodiments, the custom vector embedding model can be a neural network, and the initial sequence block, the residual block, and the output sequential block can include a plurality of layers in the neural network.

In some embodiments, the initial sequence block, the residual block, and the output sequential block can be trained using a plurality of similar question pairs and a plurality of dissimilar question pairs.

In some embodiments, the initial sequence block, the residual block, and the output sequential block can be trained based on a contrastive loss, a uniformity loss, and/or a density loss of the plurality of similar question pairs and the plurality of dissimilar question pairs.

In some embodiments, a majority of dissimilar question pairs can be further apart in the custom vector embedding space of the custom vector embedding model than in a default vector embedding space of a default vector embedding model corresponding to the default vector embedding; and a majority of similar question pairs can be closer together in the custom vector embedding space of the custom vector embedding model than in the default vector embedding space of the default vector embedding model.

In some embodiments, each synthetic variant question can include at least one variation from a corresponding example user question, the variation can include at least one of: a conceptual variation, an entity variation, a grammatical variation, a linguistic variation, a numerical variation, a specificity variation and/or a temporal variation.

In some embodiments, the domain-specific language can include telematics terminology and the user question can relate to telematics data originating from at least one telematics device installed in at least one vehicle.

In some embodiments, the custom vector embedding can include an array of numbers, each number representing a strength of association with at least one semantic concept.

In some embodiments, the custom vector embedding model can be a neural network, and the initial sequence block, the residual block, and the output sequential block can include at least one linear transformation layer, at least one hyperbolic tangent layer, at least one layer normalization layer, and/or at least one parametric rectified linear unit activation layer.

In accordance with a broad aspect, there is provided a non-transitory computer readable medium having instructions stored thereon executable by at least one processor to implement any of the methods described herein.

BRIEF DESCRIPTION OF THE DRAWINGS

Several embodiments will be described in detail with reference to the drawings, in which:

FIG. 21 is an example graphical user interface for an example fleet management chatbot, in accordance with an embodiment.

Figure 1:
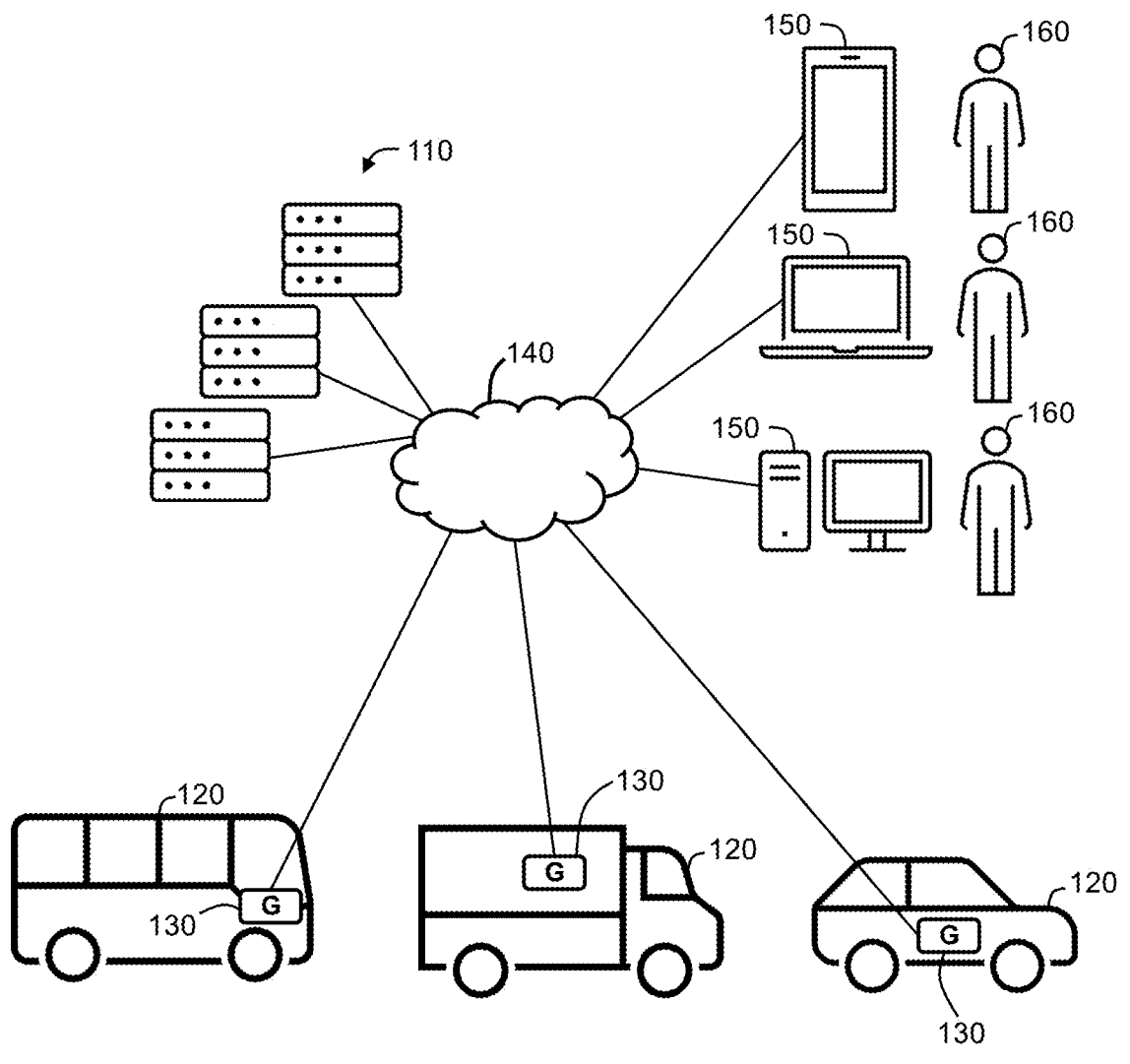
FIG. 1 is a block diagram of various components interacting with an example fleet management system, in accordance with an embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DETAILED DESCRIPTION

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Referring to FIG. 1, there is shown an example asset management system 110 for managing a plurality of assets equipped with a plurality of telematics devices 130. In operation, the telematics devices 130 can gather various data associated with the assets (i.e., telematics data) and share the telematics data with the asset management system 110. The asset management system 110 can process the telematics data to generate various insights relating to the assets. The asset management system 110 can be remotely located from the telematics devices 130 and the assets.

For ease of exposition, various examples will now be described in which the assets are vehicles 120 and the asset management system 110 is referred to as a fleet management system 110. However, it should be appreciated that the systems and methods described herein may be used to manage other types of assets, in some embodiments. Such assets may include any apparatuses, articles, machines, and/or equipment that can be equipped and monitored by the telematics devices 130. For example, other assets may include shipping containers, trailers, construction equipment, generators, and the like. The nature and format of the telematics data may vary depending on the type of asset.

The vehicles 120 may include any machines for transporting goods or people. The vehicles 120 can include motor vehicles, such as, but not limited to, motorcycles, cars, trucks, and/or buses. The motor vehicles can be gas, diesel, electric, hybrid, and/or alternative fuel. In some cases, the vehicles 120 may include other kinds of vehicles, such as, but not limited to, railed vehicles (e.g., trains, trams), watercraft (e.g., ships, boats), aircraft (e.g., airplanes, helicopters), and/or spacecraft. Each vehicle 120 can be equipped with one or more telematics devices 130. Although only three vehicles 120 having three telematics devices 130 are shown in the illustrated example for ease of illustration, it should be appreciated that there can be any number of vehicles 120 and telematics devices 130. In some cases, the fleet management system 110 may manage hundreds, thousands, or even millions of vehicles 120 and telematics devices 130.

The telematics devices 130 can be standalone devices that are removably installed in the vehicles 120, such as, but not limited to, vehicle tracking devices. Alternatively, the telematics devices 130 can be integrated or embedded components that are integral with the vehicles 120, such as, but not limited to, telematic control units (TCUs). The telematics devices 130 can gather various telematics data from the vehicles 120 and share the telematics data with the fleet management system 110. The telematics data may include any information, parameters, attributes, characteristics, and/or features associated with the vehicles 120. For example, the telematics data can include, but is not limited to, location data, speed data, acceleration data, engine data, brake data, transmission data, fluid data (e.g., oil, coolant, and/or washer fluid), energy data (e.g., battery and/or fuel level), odometer data, vehicle identifying data, error/diagnostic data, tire pressure data, seatbelt data, and/or airbag data. In some cases, the telematics data may include information related to the telematics devices 130 and/or other devices associated with the telematics devices 130.

The fleet management system 110 can process the telematics data collected from the telematics devices 130 to provide various analysis, predictions, reporting, and alerts. For example, the fleet management system 110 can process the telematics data to gain additional information regarding the vehicles 120, such as, but not limited to, trip distances/ times, idling times, harsh braking/driving, usage rate, and/or fuel economy. Various data analytics and machine learning techniques may be used by the fleet management system 110 to process the telematics data. The telematics data can then be used to manage various aspects of the vehicles 120, such as, but not limited to, route planning, vehicle maintenance, driver compliance, asset utilization, and/or fuel management. In this manner, the fleet management system 110 can improve the productivity, efficiency, safety, and/or sustainability of the vehicles 120.

A plurality of computing devices 150 can provide access to the fleet management system 110 to a plurality of users 160. This may allow the users 160 to manage and track the vehicles 120, for example, using various telematics data collected and/or processed by the fleet management system 110. The computing devices 150 can be any computers, such as, but not limited to, personal computers, portable computers, wearable computers, workstations, desktops, laptops, smartphones, tablets, smartwatches, PDAs (personal digital assistants), and/or mobile devices. The computing devices 150 can be remotely located from the fleet management system 110, telematics devices 130, and vehicles 120. Although only three computing devices 150 operated by three users 160 are shown in the illustrated example for ease of illustration, it should be appreciated that there can be any number of computing devices 150 and users 160. In some cases, the fleet management system 110 may service hundreds, thousands, or even millions of computing devices 150 and users 160.

The fleet management system 110, telematics devices 130, and computing devices 150 can communicate through one or more networks 140. The networks 140 may be wireless, wired, or a combination thereof. The networks 140 may employ any communication protocol and utilize any communication medium. For example, the networks 140 may include, but is not limited to, Wi-Fi™ networks, Ethernet networks, Bluetooth™ networks, NFC (near-field communication) networks, radio networks, cellular networks, and/or satellite networks. The networks 140 may be private, public, or a combination thereof. For example, the networks 140 may include, but is not limited to, LANs (local area networks), WANs (wide area networks), and/or the Internet. The networks 140 may also facilitate communication with other devices and systems that are not shown.

The fleet management system 110 can be implemented using one or more computers. For example, the fleet management system 110 may be implemented using one or more computer servers. The servers can be distributed across a wide geographical area. In some embodiments, the fleet management system 110 may be implemented using virtual machines and/or a cloud computing platform, such as Google Cloud Platform™ or Amazon Web Services™ In other embodiments, the fleet management system 110 may be implemented using one or more dedicated computer servers.

Figure 2:
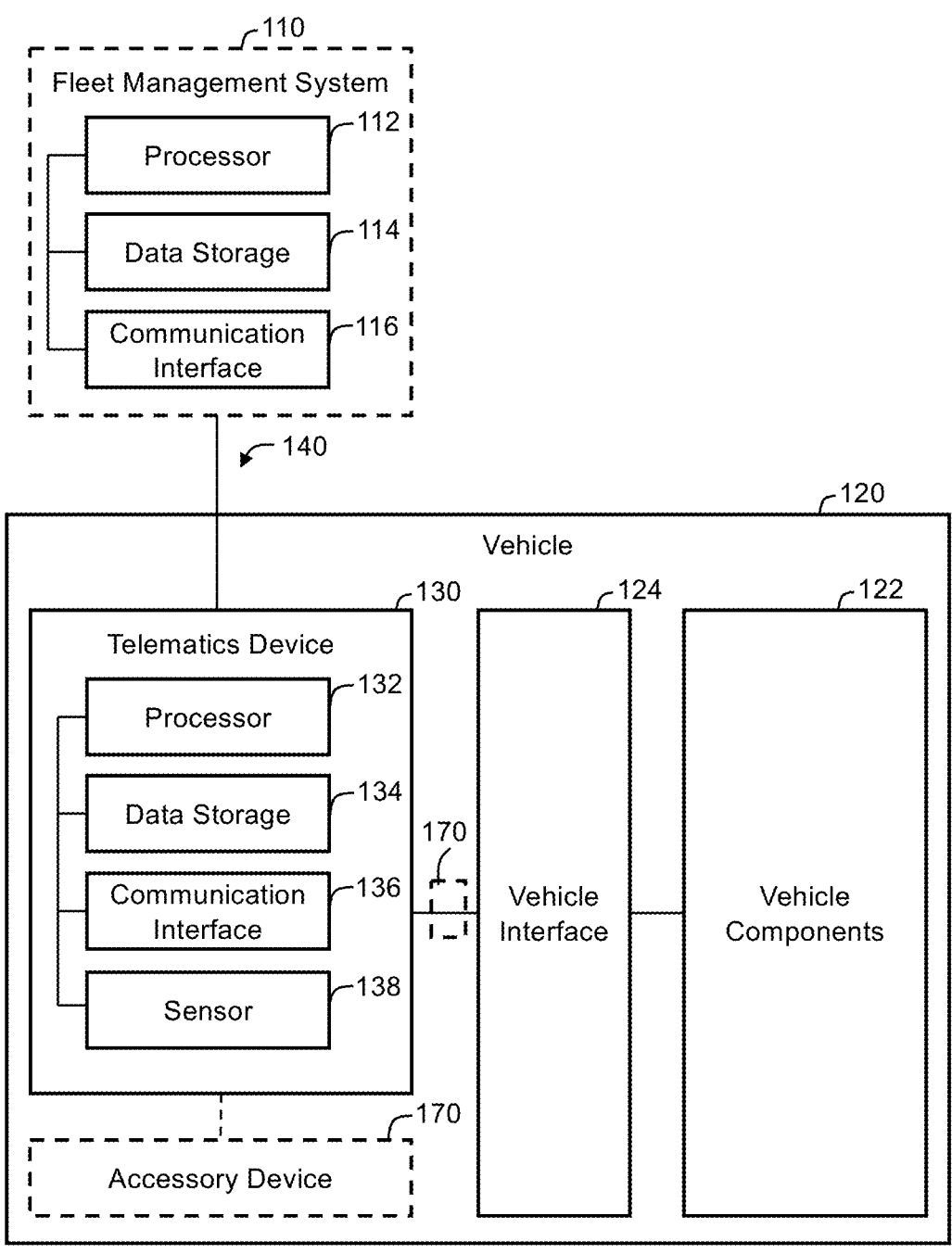
FIG. 2 is a block diagram of an example fleet management system interacting with an example telematics device and example vehicle, in accordance with an embodiment.

Reference will now be made to FIG. 2 to further explain the operation of the fleet management system 110, telematics devices 130, and vehicles 120. In the illustrated example, the fleet management system 110 is in communication with a telematics device 130 that is installed in a vehicle 120.

As shown, the fleet management system 110 can include one or more processors 112, one or more data storages 114, and one or more communication interfaces 116. Each of these components may communicate with each other. Each of these components may be combined into fewer components or divided into additional subcomponents. Two or more of these components and/or subcomponents may be distributed across a wide geographical area.

The processors 112 can control the operation of the fleet management system 110. The processors 112 can be implemented using any suitable processing devices or systems, such as, but not limited to, CPUs (central processing units), GPUs (graphics processing units), FPGAs, (field programmable gate arrays), ASICs (application specific integrated circuits), DSPs (digital signal processors), NPUs (neural processing units), QPUs (quantum processing units), microprocessors, and/or controllers. The processors 112 can execute various computer instructions, programs, and/or software stored on the data storages 114 to implement various methods described herein. For example, the processors 112 may process various telematics data collected by the fleet management system 110 from the telematics device 130.

The data storages 114 can store various data for the fleet management system 110. The data storages 114 can be implemented using any suitable data storage devices or systems, such as, but not limited to, RAM (random access memory), ROM (read only memory), flash memory, HDD (hard disk drives), SSD (solid-state drives), magnetic tape drives, optical disc drives, and/or memory cards. The data storages 114 may include volatile memory, non-volatile memory, or a combination thereof. The data storages 114 may include non-transitory computer readable media. The data storages 114 can store various computer instructions, programs, and/or software that can be executed by the processors 112 to implement various methods described herein. The data storages 114 may store various telematics data collected from the telematics device 130 and/or processed by the processors 112.

The communication interfaces 116 can enable communication between the fleet management system 110 and other devices or systems, such as the telematics device 130. The communication interfaces 116 can be implemented using any suitable communication devices or systems. For example, the communication interfaces 116 may include various physical connectors, ports, or terminals, such as, but not limited to, USB (universal serial bus), Ethernet, Thunderbolt, Firewire, SATA (serial advanced technology attachment), PCI (peripheral component interconnect), HDMI (high-definition multimedia interface), and/or DisplayPort. The communication interfaces 116 can also include various wireless interface components to connect to wireless networks, such as, but not limited to, Wi-Fi™, Bluetooth™, NFC, cellular, and/or satellite. The communication interfaces 116 can enable various inputs and outputs to be received at and sent from the fleet management system 110. For example, the communication interfaces 116 may be used to retrieve telematics data from the telematics device 130.

As shown, the telematics device 130 also can include one or more processors 132, one or more data storages 134, and one or more communication interfaces 136. Additionally, the telematics device 130 can include one or more sensors 138. Each of these components may communicate with each other. Each of these components may be combined into fewer components or divided into additional subcomponents.

The processors 132 can control the operation of the telematics device 130. Like the processors 112 of the fleet management system 110, the processors 132 of the telematics device 130 can be implemented using any suitable processing devices or systems. The processors 132 can execute various computer instructions, programs, and/or software stored on the data storages 134. For example, the processors 132 can process various telematics data gathered from the vehicle components 122 or the sensors 138.

The data storages 134 can store various data for the telematics device 130. Like the data storages 114 of the fleet management system 110, the data storages 134 of the telematics device 130 can be implemented using any suitable data storage devices or systems. The data storages 134 can store various computer instructions, programs, and/or software that can be executed by the processors 132. The data storages 134 can also store various telematics data gathered from the vehicle components 122 or the sensors 138.

The communication interfaces 136 can enable communication between the telematics device 130 and other devices or systems, such as the fleet management system 110 and vehicle components 122. Like the communication interfaces 116 of the fleet management system 110, the communication interfaces 136 of the telematics device 130 can be implemented using any suitable communication devices or systems. The communication interfaces 136 can enable various inputs and outputs to be received at and sent from the telematics device 130. For example, the communication interfaces 136 may be used collect telematics data from the vehicle components 122 and sensors 138 or to send telematics data to the fleet management system 110. The communication interfaces 136 can also be used to connect the telematics device 130 with one or more accessory devices 170.

The sensors 138 can detect and/or measure various environmental events and/or changes. The sensors 138 can include any suitable sensing devices or systems, including, but not limited to, location sensors, velocity sensors, acceleration sensors, orientation sensors, vibration sensors, proximity sensors, temperature sensors, humidity sensors, pressure sensors, optical sensors, and/or audio sensors. When the telematics device 130 is installed in the vehicle 120, the sensor 138 can be used to gather telematics data that may not be obtainable from the vehicle components 122. For example, the sensors 138 may include a satellite navigation device, such as, but not limited to, a GPS (global positioning system) receiver, which can measure the location of the vehicle 120. As another example, the sensor 138 may include accelerometers, gyroscopes, magnetometers, and/or IMUs (inertial measurement units), which can measure the acceleration and/or orientation of the vehicle 120.

In some cases, the telematics device 130 may operate in conjunction with one or more accessory devices 170 that are in communication with the telematics device 130. The accessory devices 170 can include expansion devices that can provide additional functionality to the telematics device 130. For example, the accessory devices 170 may provide additional processing, storage, communication, and/or sensing functionality through one or more additional processors, data storages, communication interfaces, and/or sensors (not shown). The accessory devices 170 can also include adapter devices that facilitate communication between the communication interface 136 and the vehicle interfaces 124, such as a cable harness.

The telematics device 130 can be installed within the vehicle 120, removably or integrally. One or more accessory devices 170 can also be installed in the vehicle 120 along with the telematics device 130. As shown, the vehicle 120 can include one or more vehicle components 122 and one or more vehicle interfaces 124. Each of these components may be combined into fewer components or divided into additional subcomponents.

The vehicle components 122 can include any subsystems, parts, and/or subcomponents of the vehicle 120. The vehicle components 122 can be used to operate and/or control the vehicle 120. For example, the vehicle components 122 can include, but are not limited to, powertrains, engines, transmissions, steering, braking, seating, batteries, doors, and/or suspensions. The telematics device 130 can gather various telematics data from the vehicle components 122. For example, the telematics device 130 may communicate with one or more ECUs (electronic control units) that control the vehicle components 122 and/or one or more internal vehicle sensors.

The vehicle interfaces 124 can facilitate communication between the vehicle components 122 and other devices or systems. The vehicle interfaces 124 can include any suitable communication devices or systems. For example, the vehicle interfaces 124 may include, but is not limited to, OBD-II (on-board diagnostics 2) ports, CAN (controller area network) bus connectors, proprietary or manufacturer-specific connectors, commercial or heavy-duty diagnostics connectors (e.g., J1708, J1939, etc.), etc. The vehicle interfaces 124 can be used by the telematics device 130 to gather telematics data from the vehicle components 122. For example, a communication interface 136 of the telematics device 130 can be connected to a vehicle interface 124 to communicate with the vehicle components 122. In some cases, an accessory device 170, such as a cable harness, can provide the connection between the communication interface 136 and the vehicle interface 124.

Figure 3:
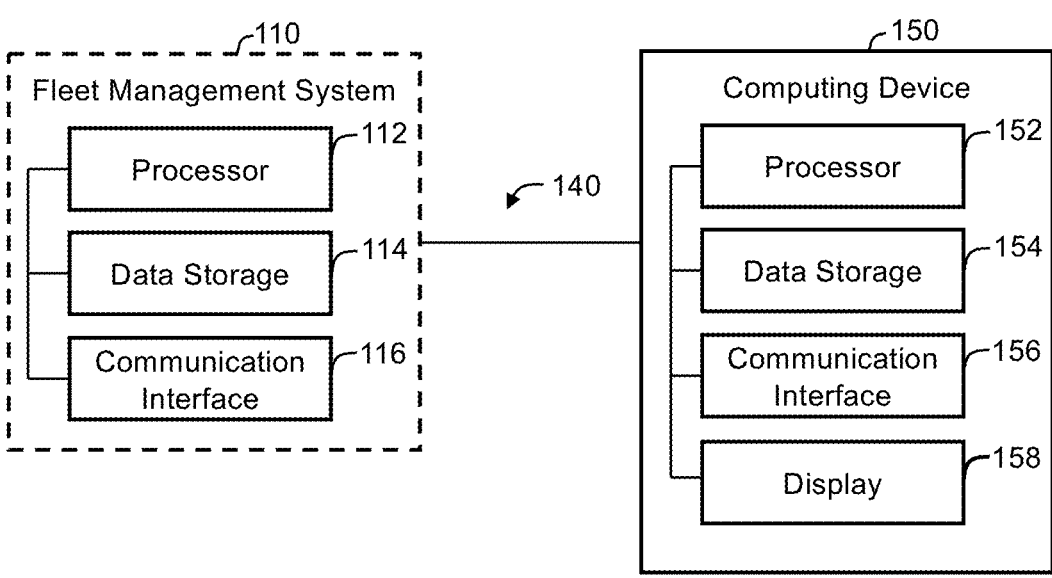
FIG. 3 is a block diagram of an example computing device interacting with an example fleet management system, in accordance with an embodiment.

Reference will now be made to FIG. 3 to further explain the operation of the fleet management system 110 and computing devices 150. In the illustrated example, the fleet management system 110 is in communication with a computing device 150. As shown, the computing device 150 also can include one or more processors 152, one or more data storages 154, and one or more communication interfaces 156. Additionally, the computing device 150 can include one or more displays 158. Each of these components can communicate with each other. Each of these components may be combined into fewer components or divided into additional subcomponents.

The processors 152 can control the operation of the computing device 150. Like the processors 112 of the fleet management system 110 and the processors 132 of the telematics device 130, the processors 152 of the computing device 150 can be implemented using any suitable processing devices or systems. The processors 152 can execute various computer instructions, programs, and/or software stored on the data storages 154 to implement various methods described herein. For example, the processors 152 may process various telematics data received from the fleet management system 110 and/or the telematics device 130.

The data storages 154 can store various data for the computing device 150. Like the data storages 114 of the fleet management system 110 and the data storages 134 of the telematics device 130, the data storages 154 of the computing device 150 can be implemented using any suitable data storage devices or systems. The data storages 154 can store various computer instructions, programs, and/or software that can be executed by the processor 152 to implement various methods described herein. The data storages 154 may store various telematics data received from the fleet management system 110 and/or the telematics device 130.

The communication interfaces 156 can enable communication between the computing device 150 and other devices or systems, such as the fleet management system 110. Like the communication interfaces 116 of the fleet management system 110 and the communication interfaces 136 of the telematics device 130, the communication interfaces 156 of the computing device 150 can be implemented using any suitable communication devices or systems. The communication interfaces 156 can enable various inputs and outputs to be received at and sent from the computing device 150. For example, the communication interfaces 116 may be used to retrieve telematics data from the fleet management system 110.

The displays 158 can visually present various data for the computing device 150. The displays 158 can be implemented using any suitable display devices or systems, such as, but not limited to, LED (light-emitting diode) displays, LCDs (liquid crystal displays), ELDs (electroluminescent displays), plasma displays, quantum dot displays, and/or cathode ray tube (CRT) displays. The displays 158 can be an integrated component that is integral with the computing device 150 or a standalone device that is removably connected to the computing device 150. The displays 158 can present various user interfaces for various computer applications, programs, and/or software associated with various methods described herein. For example, the displays 158 may display various visual representations of the telematics data.

Figure 4:
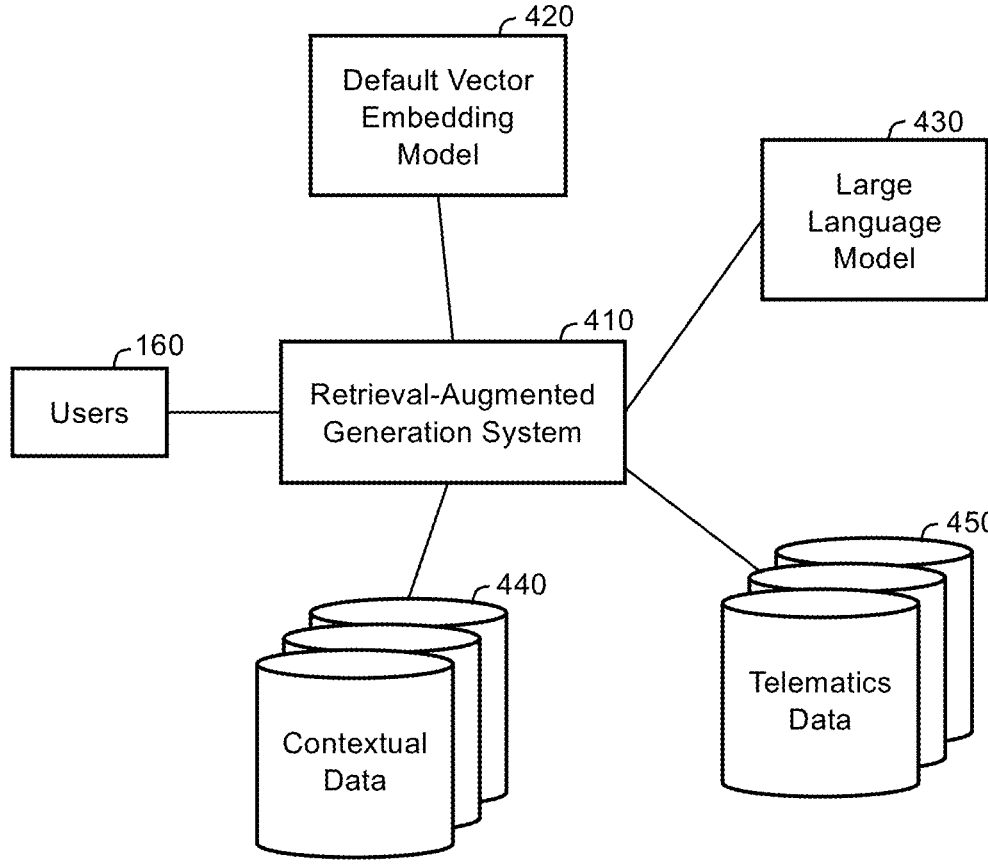
FIG. 4 is a block diagram of an example retrieval-augmented generation system interacting with various components, in accordance with an embodiment.

Referring now to FIG. 4, there is shown an example retrieval-augmented generation system 410. The retrieval-augmented generation system 410 can be implemented by at least one processor executing instructions stored on at least one processor, such as, but not limited to, fleet management system 110 and/or one or more computing devices 150. The retrieval-augmented generation system 410 can generally enhance the generative capabilities of a large language model 430 by dynamically retrieving and incorporating additional information into the generative process. This can allow the large language model 430 to leverage information that is more current or specific than the data it was trained on, which can improve accuracy of generation and reduce the likelihood of hallucinations. Various examples will now be described in which the retrieval-augmented generation system 410 is implemented by a fleet management system 110 to generate outputs related to telematics. However, it should be appreciated that the retrieval-augmented generation system 410 may be implemented in other applications and is not limited to telematics.

The retrieval-augmented generation system 410 can be implemented by the fleet management system 110 (e.g., by at least one processor 112 executing instructions stored on at least one data storage 114) to allow a large language model 430 to generate responses to user questions pertaining to telematics data (e.g., originating from one or more telematics devices 130 installed in one or more vehicles 120). In this manner, the fleet management system 110 can support conversational interactions with users 160 regarding telematics data, which can be more intuitive, faster, and more accessible than navigating through conventional user interface elements, such as buttons, menus, forms, etc.

In operation, the retrieval-augmented generation system 410 can receive a user question, use a default vector embedding model 420 to generate a default vector embedding for the user question, retrieve contextual data 440 based on the vector embedding, generate a contextualized prompt based on the user question and the contextual data, and prompt the large language model 430 using the contextualized prompt to generate a response to the user question.

The user question can include any natural language or textual data input. For example, the user question may include one or more sentences, phrases, paragraphs, words, characters, etc. The user question may include one or more requests, commands, instructions, queries, etc. The user question may pertain to telematics data originating from one or more telematics devices 130 installed in one or more vehicles 120. For example, the user question may include, "Which vehicles in my fleet operated the least?", "Compare our fleet safety risk to last year.", "Which vehicles currently have active or pending fault codes?", "How many gallons of fuel were used last month?", "What is the most common rule broken?", etc. The user question can be received from a computing device 150 associated with a user 160. The user question can originate from the user 160 or from another AI system that the user 160 has instructed to perform a task.

The default vector embedding model 420 can convert, transform, translate, and/or encode the user question to generate a default vector embedding. The default vector embedding can numerically represent the semantic meaning, relationships, and context of the user question. The default vector embedding can include an array of numbers, with each number corresponding to a dimension in a default vector embedding space. A default vector embedding can include hundreds, thousands, or more dimensions, with each dimension representing one or more semantic features, ideas, or concepts. Each number in the array can represent a strength of association with a corresponding dimension. Accordingly, user questions involving similar concepts should have similar default vector embeddings that are close together in the default vector embedding space, whereas user questions involving different concepts should have dissimilar default vector embeddings and be far apart in the default vector embedding space. For example, the default vector embeddings for "king" and "queen" should be more similar and closer together than those for "king" and "bicycle".

The default vector embedding model 420 can include any suitable machine learning or artificial intelligence model, including, but not limited to, an artificial neural network and/or a generative pretrained transformer. The default vector embedding model 420 can be a commercial model, such as, but not limited to, Google Gemini™ embedding models (e.g., gemini-embedding-exp-03-07, text-embedding-004, or embedding-001) or OpenAI™ embedding models (e.g., text-embedding-3-large, text-embedding-ada-002, or text-embedding-3-small).

The default vector embedding can be used to identify and retrieve contextual data 440 that is relevant to the user question. For example, various contextual data 440 can also be represented as default vector embeddings, and a similarity search can be performed to find the contextual data 440 most relevant to the user question. In other words, the user question vector embedding can be compared to contextual data vector embeddings to find one or more contextual data vector embeddings that are most similar to the user question vector embedding.

The contextual data 440 can include various information for enhancing or augmenting the user question. In general, the contextual data 440 can include any information that can help the large language model 430 clarify, understand, or interpret the user question. The contextual data 440 can also include information that can help the large language model 430 make inferences or assumptions. For example, the contextual data 440 may include example user questions and example desired outputs from the large language model 430. The contextual data 440 may also include various definitions, explanations, and background information. Other examples of contextual data 440 may include preferred units of measure, previous user history, current date and time, etc.

The large language model 430 can be prompted using a contextualized prompt generated based on the user question and the retrieved contextual data 440 to generate a response to the user question. The large language model 430 can include any suitable machine learning or artificial intelligence model, including, but not limited to, an artificial neural network and/or a generative pretrained transformer. The large language model 430 can be a commercial model, such as, but not limited to, Google Gemini™, OpenAI ChatGPT™, Meta Llama™, and/or DeepSeek™. The contextualized prompt can include some or all of the user question and the retrieved contextual data 440. The generated output by the large language model 430 can be provided to the user 160 to respond to the user question.

In some cases, the output received from the large language model 430 can include an executable database query. The executable database query can be used to retrieve telematics data 450 relevant to the user question. The retrieved telematics data can be provided to the user 160 to respond to the user question. In this manner, user questions pertaining to telematics data can be responded to without the large language model 430 accessing the telematics data 450.

Figures 5, 6:
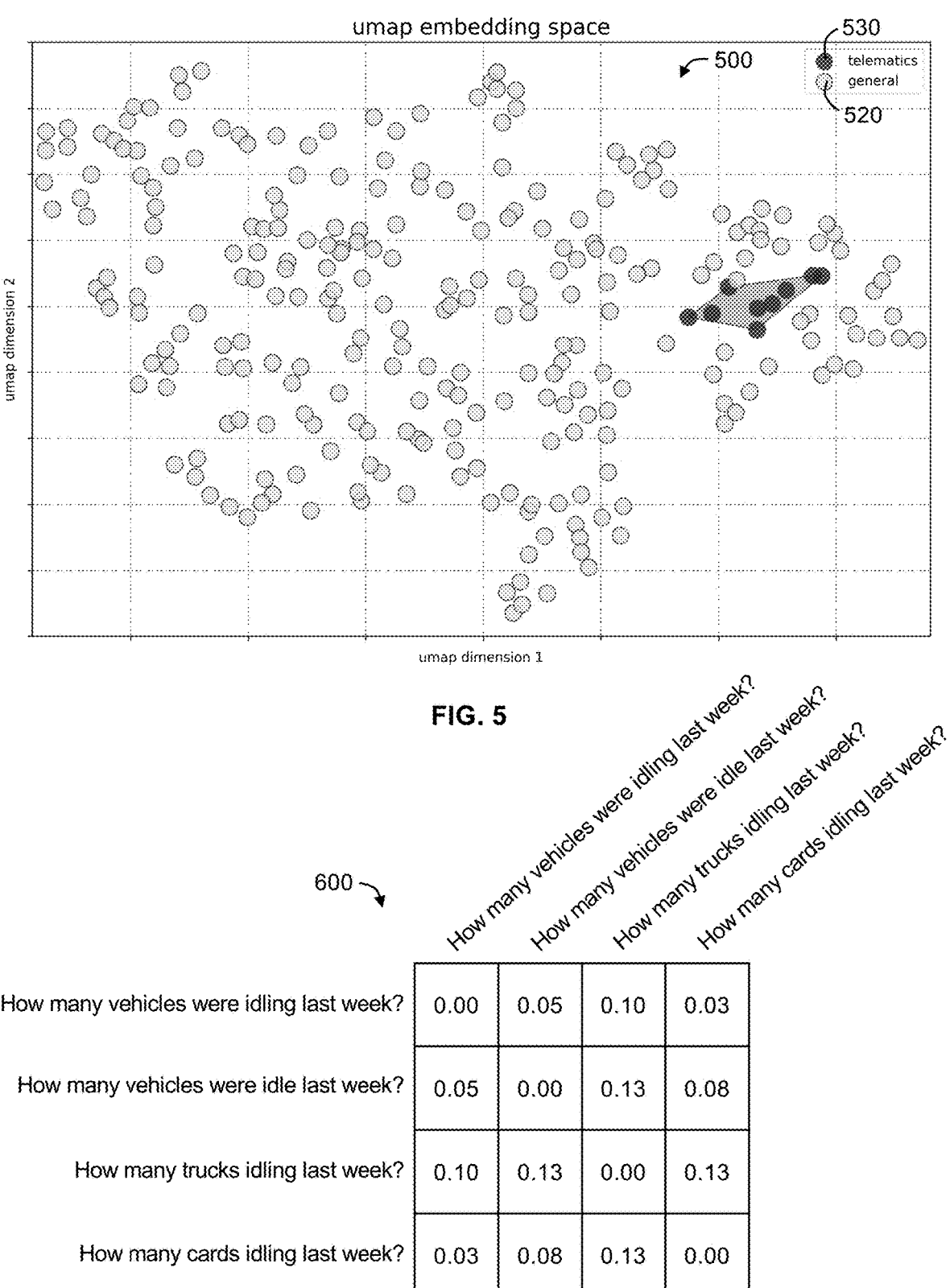
FIG. 5 is a graph of example user questions in an example default vector embedding space, in accordance with an embodiment.
FIG. 6 is a distance matrix of example user questions in an example default vector embedding space, in accordance with an embodiment.
Figure 7:
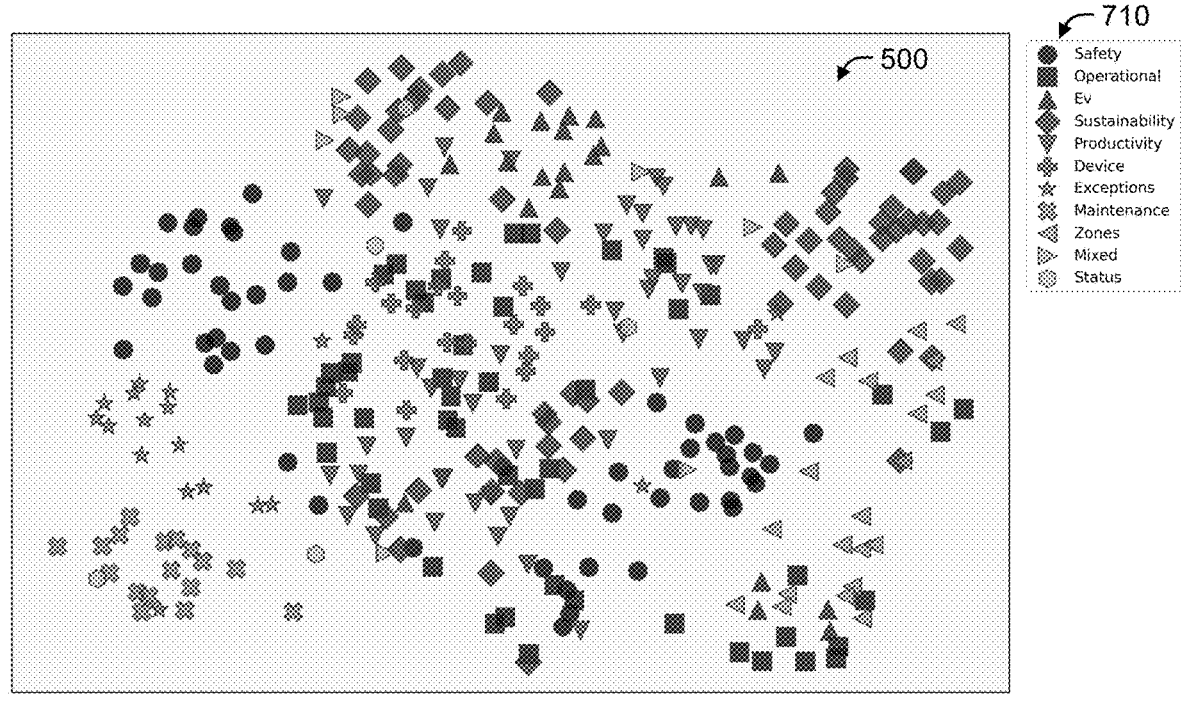
FIG. 7 is a graph of example user questions pertaining to example telematics topics in an example default vector embedding space, in accordance with an embodiment.

One potential weakness of the retrieval-augmented generation system 410 is that it is highly dependent on the performance of the default vector embedding model 420. If the default vector embedding model 420 fails to correctly represent semantic similarity, the retrieval-augmented generation system 410 will fail to retrieve relevant contextual data 440, negatively impacting the information used for generation, and leading to less accurate, less relevant, or even factually incorrect outputs by large language model 430. The inventors recognized and realized that default vector embedding models 420 are not optimized for domain-specific topics, such as, but not limited to, telematics. Domain-specific topics often involve specialized terminology (e.g., domain-specific language, jargon, or technical language) for specific communicative contexts that may not be well understood outside of those contexts. Since default vector embedding models 420 are trained on massive and diverse datasets, including a significant portion of the publicly available internet, default vector embedding models 420 are optimized to represent, group, and disperse all human concepts throughout the default vector embedding space. However, domain-specific topics, such as, but not limited to, telematics, only occupy a small portion of the default vector embedding space. As a result, default vector embeddings for domain-specific topics are highly sensitive and small perturbations in input can result in off-target retrieval of contextual data 440. Furthermore, a default vector embedding model cannot define similarity differently for retrieval purposes (e.g., defining "car" and "truck" as semantically different if their data is stored in different database tables). Reference will now be made to FIGS. 5-7 to further demonstrate these problems.

FIG. 5 shows a plurality of example user questions in an example default vector embedding space 500 of an example default vector embedding model 420. In the illustrated example, the example user questions include questions regarding general topics 520 and questions regarding telematics topics 530. For ease of illustration, the dimensionality of the default vector embedding space 500 has been reduced into two dimensions using Uniform Manifold Approximation and Projection (UMAP). However, it should be appreciated that the default vector embedding space 500 can include hundreds, thousands, or more dimensions. As shown, the telematics topics 530 represent a very small portion of the overall default vector embedding space 500. The telematics topics 530 only occupy 0.65% of the default vector embedding space 500, wasting 99.35% of the space. The telematics topics 530 are more compressed than the general topics 520, having an average pairwise distance of 0.5025, compared to 0.6755.

FIG. 6 shows a distance matrix 600 of a plurality of example user questions pertaining to telematics. The distance matrix 600 shows the distance between the user questions in the default vector embedding space 500 of a default vector embedding model 420. In other words, the distance matrix 600 represents the semantic dissimilarity of the user questions for the default vector embedding model 420. In the illustrated example, all of the user questions are semantically similar. Although the user questions may contain different words and phrasing, all of the user questions share a similar meaning. As should be appreciated, the difference in distance between semantically similar questions should always be small. However, the distance matrix 600 illustrates substantial differences in distance between semantically similar questions in the default vector embedding space 500. In fact, there is a 400% difference between the most and least divergent question pairs.

FIG. 7 shows a plurality of example questions regarding a plurality of example telematics topics 710 in the default vector embedding space 500 of a default vector embedding model 420. As shown, the telematics topics 710 are uniformly dispersed within a small region of the default vector embedding space 500, and do not form distinct clusters. Different telematics topics 710 overlap significantly and mix heavily. Many semantically dissimilar topics neighbor each other in the default vector embedding space 500. Concepts that should be close together are far apart and vice versa.

One potential solution to these problems is to tune a default vector embedding model 420. In other words, a default vector embedding model 420 could be retrained using a more specific dataset to adapt the model to be better suited for domain-specific topics, including, but not limited to, telematics. However, it can be computationally expensive to tune vector embedding models, which are typically large models that require significant quantities of data to retrain. It can also be challenging to obtain sufficient training data, which can lead to overfitting of the model due to lack of training data. Furthermore, many default vector embedding models provide little to no support for tuning, for example, not permitting custom loss functions. Hosting a tuned model can also be less efficient, less scalable, and more resource intensive than leveraging an existing model.

Instead, the inventors recognized and realized the default vector embeddings of a default vector embedding model 420 could be reprojected into a new, custom vector embedding space that is better suited for domain-specific topics, such as, but not limited to, telematics. The reprojected vector embeddings can be referred to as custom vector embeddings. The inventors recognized and realized that reprojecting default vector embeddings into a custom vector embedding space could be more computationally efficient, require less training data, and preserve model generalization better than tuning a default vector embedding model 420.

Figure 8:
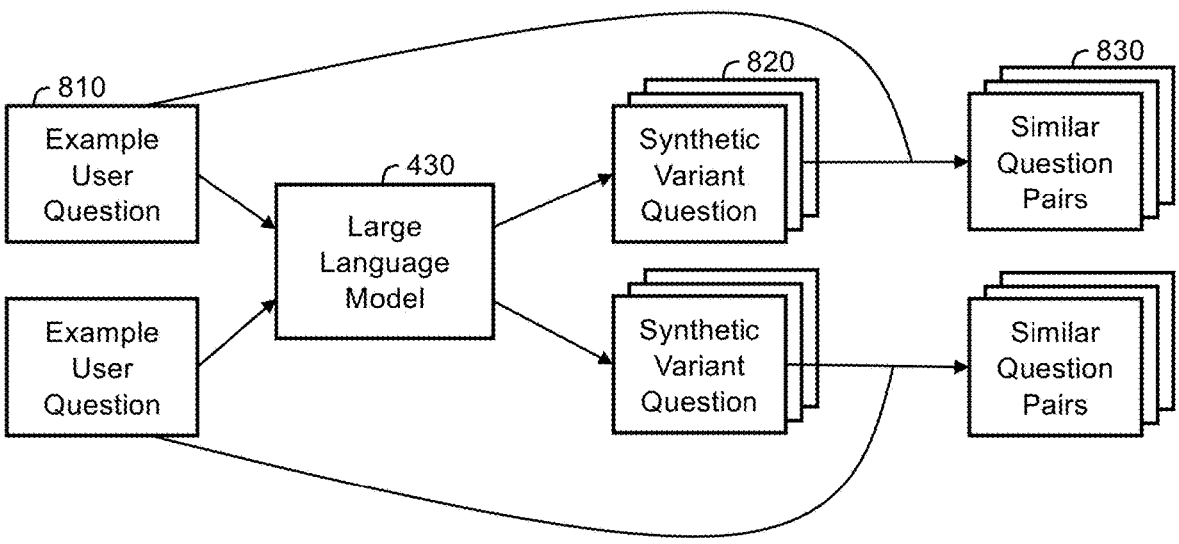
FIG. 8 is a flowchart of an example process to generate similar question pairs, in accordance with an embodiment.
Figures 9, 10:
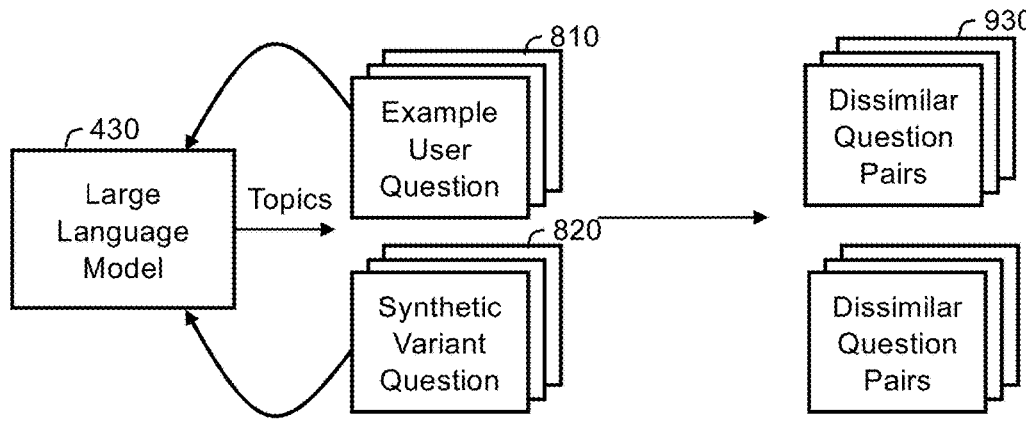
FIG. 9 is a flowchart of an example process to generate dissimilar question pairs, in accordance with an embodiment.
FIG. 10 is a block diagram of an example custom vector embedding model, in accordance with an embodiment.

The inventors recognized and realized that a machine learning or artificial intelligence model could be trained to reproject default vector embeddings into custom vector embeddings without being explicitly programmed to do so. This model can be referred to as a custom vector embedding model. The inventors recognized and realized that artificial neural networks could be particularly effective as custom vector embedding models due to their ability to perform non-linear transformations, as well as handle hierarchical or nested information. However, one challenge with training a neural network to reproject vector embeddings is the amount of training data required. Tens of thousands or more example user questions may be required to effectively train a neural network. The inventors recognized and realized that manually creating this many questions would be impractical, if not impossible. Instead, the inventors recognized and realized that a large language model 430 could be used to generate synthetic questions that could be used to train a model. Reference will now be made to FIGS. 8 and 9 to illustrate examples of generating synthetic questions using a large language model 430.

FIG. 8 shows an example process for generating synthetic variant questions 820 and similar question pairs 830. The similar question pairs 830 can be used as positive examples (i.e., semantically similar questions) to train a custom vector embedding model to reproject default vector embeddings. As shown, a large language model 430 can be used to generate the synthetic variant questions 820 based on example user questions 810. A plurality of synthetic variant questions 820 can be generated for each example user question 810. In this manner, a substantial amount of synthetic, artificial, or computer-generated questions 820 can be automatically generated using a small number of manual or human-created questions 810. This process can produce a quantity of questions that would be impractical, if not impossible, to create manually.

Each synthetic variant question 820 can be a variation or permutation of the example user question 810 that it was generated based on. The example user questions 810 and synthetic variant questions 820 can contain domain-specific language, such as, but not limited to, telematics. Each synthetic variant question 820 can be semantically similar to the corresponding example user question 810. For example, the example user question 810 "What is the GPS top speed in each zone?" may be used to prompt a large language model 430 to generate the following synthetic variant questions 820:

What was the GPS top speed in each zone this week?
Which zone had vehicles exceeding 80 mph in the last 30 days?
Can you give me a report of top speeds for all busses in all my Zones?
What's the highest speed recorded for my vehicles in California last week?
I need the top GPS speeds for trucks in Zone B yesterday.
Give me a list of the top 5 GPS speeds recorded in Zone F over the past week.
What was the maximum speed in a zone last Tuesday?

Each synthetic variant question 820 can vary or differ from the corresponding example user question 810 from which it was generated in one or more ways. In other words, each synthetic variant question 820 can include one or more variations. The variations may include, but are not limited to, conceptual, entity, grammatical, linguistic, numerical, specificity, and/or temporal variations.

In some embodiments, one or more synthetic variant questions 820 may have a conceptual variation. That is, a synthetic variant question 820 may involve a related concept to the corresponding example user question 810. For example, "Which vehicles idle the most in my fleet?" can be a conceptual variation of "Which vehicles have the worst fuel economy in my fleet?" In some cases, a conceptual variation can involve two different fields stored in a common database table, irrespective of the conceptual similarity of the fields. For example, "Which vehicles drove in the rain this week?" may be a conceptual variation of "Which vehicles had low tire pressure this week?", assuming windshield wiper data was stored in the same database table as tire pressure data.

Additionally, or alternatively, one or more synthetic variant questions 820 may have an entity variation. That is, a synthetic variant question 820 may include a different named entity than the corresponding example user question 810. For example, "How much fuel did Betamax33 consume in the last 6 months?" can be an entity variation of "How much fuel did Carter64 consume in the last 6 months?"

Additionally, or alternatively, one or more synthetic variant questions 820 may have a grammatical variation. That is, a synthetic variant question 820 may include a different grammatical structure than the corresponding example user question 810. For example, "What were the top 10 safest vehicles this year?" can be a grammatical variation of "What were the 10 vehicles this year that were the safest."

Additionally, or alternatively, one or more synthetic variant questions 820 may have a linguistic variation. That is, a synthetic variant question 820 may include a different linguistic style than the corresponding example user question 810. For example, "Give me the vehicles that have the most mileage this month." can be a linguistic variation of "Which vehicles traveled the furthest this month?"

Additionally, or alternatively, one or more synthetic variant questions 820 may have a numerical variation. That is, a synthetic variant question 820 may include a different numerical value than the corresponding example user question 810. For example, "List the vehicles that traveled more than 1000 km this month" can be a numerical variation of "List the vehicles that traveled more than 500 km this month."

Additionally, or alternatively, one or more synthetic variant questions 820 may have a specificity variation. That is, a synthetic variant question 820 may include a different level of specificity than the corresponding example user question 810. For example, "What Class 8 trucks were speeding last week?" can be a specificity variation of "What trucks were speeding last week?"

Additionally, or alternatively, one or more synthetic variant questions 820 may have a temporal variation. That is, a synthetic variant question 820 may include a different time than the corresponding example user question 810. For example, "How many vehicles were idling last week?" can be a temporal variation of "How many vehicles were idling this month?"

As shown, similar question pairs 830 can be generated using the example user questions 810 and the synthetic variant questions 820. A similar question pair 830 can include an example user question 810 and a synthetic variant question 820 corresponding to the example user question

810, or two synthetic variant questions 820 corresponding to the same example user question 810. For example, a similar question pair 830 may include "What is the GPS top speed in each zone?" and "What was the GPS top speed in each zone this week?" As another example, a similar question pair 830 may include "Which zone had vehicles exceeding 80 mph in the last 30 days?" and "Can you give me a report of top speeds for all busses in all my Zones?" The similar question pairs 830 can be used as positive examples (i.e., semantically similar questions) to train a custom vector embedding model.

FIG. 9 shows an example process for generating dissimilar question pairs 930. The dissimilar question pairs 930 can be used as negative examples (i.e., semantically dissimilar questions) to train a custom vector embedding model to reproject default vector embeddings. As shown, a large language model 430 can be used to assign topics to the example user questions 810 and synthetic variant questions 820. Each example user question 810 and synthetic variant question 820 can be assigned one or more topics. For example, example user question 810 "What is the GPS top speed in each zone?" and synthetic variant question 820 "What was the GPS top speed in each zone this week?" can each be assigned the topics "Speed", "Geospatial", and "Zones". The large language model 430 can be prompted to be assign as many topics as possible to each example user question 810 and synthetic variant questions 820 to avoid inadvertently using example user questions 810 and synthetic variant questions 820 as negative examples if they are semantically similar (i.e., false positives).

As shown, a plurality of dissimilar question pairs 930 can be generated using the example user questions 810 and the synthetic variant questions 820 based on the assigned topics. Each topic can represent a subject, concept, or matter of the example user question 810 or synthetic variant question 820. Each dissimilar question pair 930 can be generated to have no topics in common. For example, "What is the GPS top speed in each zone?" having assigned topics "Speed", "Geospatial", and "Zones" may be paired with "Which vehicles have the best fuel economy this month?" having assigned topics "Fuel" and "Sustainability" to form a dissimilar question pair 930. On the other hand, "What is the GPS top speed in each zone?" and "What was the GPS top speed in each zone this week?" would not be paired as a dissimilar question pair 930 because they have the topics "Speed", "Geospatial", and "Zones" in common. A dissimilar question pair 930 can include two example user questions 810 with no common topics, an example user question and 810 and a synthetic variant question 820 with no common topics, or two synthetic variant questions 820 with no common topics. The dissimilar question pairs 930 can be used as negative examples of semantically dissimilar questions to train a custom vector embedding model to reproject vector embeddings. Using topics to generate the dissimilar question pairs 930 can ensure that the dissimilar question pairs 930 are sufficiently dissimilar to minimize introducing noise to custom vector embedding model.

Figure 11:
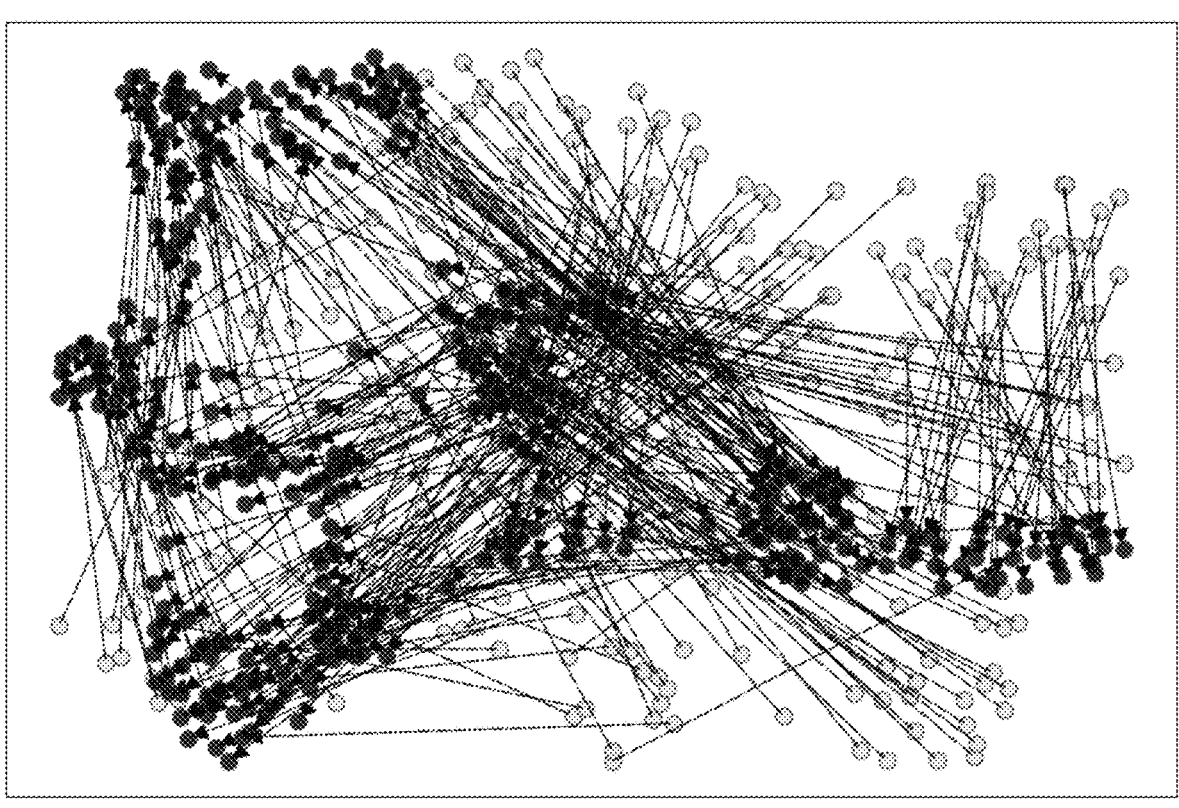
FIGS. 11 and 12 are graphs of example default vector embeddings of example user questions being reprojected into an example custom vector space, in accordance with an embodiment.

Referring now to FIG. 11, there is shown an example custom vector embedding model 1000 that can be trained using the similar question pairs 830 and dissimilar question pairs 930. In the illustrated example, the custom vector embedding model 1000 is an artificial neural network. The inventors recognized and realized that neural networks would be particularly effective for reprojecting vector embeddings due to their ability to perform non-linear transformations, as well as handle hierarchical or nested information. However, it should be appreciated that the custom vector embedding model 1000 may be implemented using other kinds of machine learning or artificial intelligence models in some embodiments. As shown, the custom vector embedding model 1000 can include an initial sequence block 1010, a residual block 1020, and an output sequential block 1030. Each block can include one or more layers of a neural network. Each layer can include a plurality of connected nodes or neurons that can perform various calculations that provide the functionality of the layers and/or blocks.

The initial sequence block 1010 can be operable to receive a default vector embedding and reduce a dimensionality of the default vector embedding to generate a reduced default vector embedding. As described herein, the default vector embedding can represent a user question containing domain-specific language, such as, but not limited to telematics, and be generated by a default vector embedding model 420. The default vector embedding can include an array of numbers, with each number corresponding to a dimension in the default vector embedding space. Each number in the array can represent a strength of association with a dimension, and each dimension can represent one or more semantic concepts. Reducing the dimensionality of the default vector embedding can improve computational efficiency and feature representation, as well as reduce overfitting. In the illustrated example, the initial sequence block 1010 reduces a default vector embedding of size [1, 768] to a reduced default vector embedding of size [1, 512]. However, it should be appreciated that the custom vector embedding model 1000 may use various other vector sizes in some embodiments.

As shown, the initial sequence block 1010 can include various layers, which can perform various functions to reduce the dimensionality of the default vector embedding. Each layer can include various interconnected nodes or neurons, which can perform various computations. In the illustrated example, the initial sequence block 1010 includes a layer normalization layer (LayerNorm), a parametric rectified linear unit activation layer (PReLU), and a linear transformation layer (Linear). Linear can apply a linear transformation to the default vector embedding, PReLu can generate various activations based on the transformed default vector embedding, and LayerNorm can normalize the activations, which can stabilize training and improve convergence.

The residual block 1020 can be operable to reproject the reduced default vector embedding to generate a reprojected reduced default vector embedding. As shown, residual block 1020 can include various layers, which can perform various functions to reproject the reduced default vector embedding. Each layer can include various interconnected nodes or neurons, which can perform various computations. In the illustrated example, the residual block 1020 also includes various layer normalization layers (LayerNorm), parametric rectified linear unit activation layers (PReLU), and linear transformation layers (Linear). As described herein, Linear can apply a linear transformations, PReLu can generate various activations, and LayerNorm can normalize the activations. As shown, the residual block 1020 can further reduce the dimensionality of the reduced default vector embedding, which can improve computational efficiency and feature representation, as well as reduce overfitting. In the illustrated example, the residual block 1020 generates a reprojected reduced default vector embedding of size [1, 256], further reducing the dimensionality of the vector. As shown, the residual block 1020 can also include a dropout regularization layer, which can randomly drop or ignore some layer outputs to increase robustness and prevent overfitting.

The output sequential block 1030 can be operable to restore a dimensionality of the reprojected reduced default vector embedding to output a custom vector embedding. As shown, the output sequential block 1030 can include various layers, which can perform various functions to generate a custom vector embedding. Each layer can include various interconnected nodes or neurons, which can perform various computations. In the illustrated example, the output sequential block 1030 include a linear transformation layer (Linear) and a hyperbolic tangent layer (Tanh). Linear can apply a linear transformation to the reprojected reduced default vector embedding and Tanh can apply a hyperbolic tangent function, which can bound and normalize the custom vector embedding. In the illustrated example, the output sequential block 1030 generates a custom vector embedding of size [1, 768), restoring the dimensionality of the vector.

As shown, the custom vector embedding model 1000 can also include one or more residual connections 1040. The residual connections can provide a passthrough, enabling information to bypass or skip portions of the neural network. The residual connections can improve gradient flow, preserve input features, and improve the stability and effectiveness of training. In the illustrated example, the custom vector embedding model 1000 includes at least one residual connection 1040 between the initial sequence block 1010 and the residual block 1020. As shown, the at least one residual connection 1040 can operate to bypass at least a portion of the initial sequence block 1010.

The custom vector embedding model 1000 can be trained to transform default vector embeddings into custom vector embeddings based on the similar question pairs 830 and dissimilar question pairs 930. The training can involve iteratively adjusting various parameters of the custom vector embedding model 1000 to minimize error or loss. Various parameters of the model can be adjusted, including the weights and biases of nodes or neurons, as well as hyperparameters, such as, epochs, batch size, learning rate, gradient clipping, stopping threshold, loss margin, density regularization weight, hard negative mining weight, optimizer selection, etc. The error of the custom vector embedding model 1000 can be determined based on contrastive loss, uniformity loss, and/or density loss. The error can be a weighted sum of one or more of these losses, and the weights of the losses can be a hyperparameter that can be adjusted during training.

Density loss can represent how well vector embeddings are clustered in a vector embedding space. Density loss can be calculated as a combination of a low density penalty and a distance penalty—the low density penalty can penalize embeddings with fewer neighbors than the number of samples, whereas the distance penalty is the average distance to neighbors of each embedding. Put another way, density loss tries to balance embeddings to have a similar number of neighbors and to be close to their neighbors, encouraging clusters. Density loss can be represented by the following formula:

$$L_{density} = \frac{1}{N} \sum_{i=1}^{N} \left[ \frac{\max\left(0, M - \sum_{j=1}^{N} \mathbb{1}_{\neq}(d_{ij} < \epsilon)\right)}{M} + \frac{\sum_{j=1}^{N} d_{ij} \cdot \mathbb{1}_{\neq}(d_{ij} < \epsilon)}{\sum_{j=1}^{N} \mathbb{1}_{\neq}(d_{ij} < \epsilon) + \varepsilon} \right]$$

where:

L_{density} is the density loss;

N is the total number of embeddings;

M is the minimal number of neighbors;

$\epsilon$ is the neighborhood radius;

$d_{ij}$ is the pairwise cosine distance between embeddings i and j;

$\mathbb{1}$ ($d_{ij}<\epsilon$) is an indicator function that equals 1 if $d_{ij}<\epsilon$ and 0 otherwise; and $\varepsilon$ is a small constant to avoid division by zero.

Uniformity loss can represent how uniformly vector embeddings are distributed in a vector embedding space. Uniformity loss can be calculated as an average of the exponential of the pairwise cosine distances between embeddings. A lower uniformity loss can indicate a more uniform distribution, whereas a higher uniformity loss can indicate that vector embeddings are too clustered, not making use of available embedding space. Uniformity loss can be represented by the following formula:

$$L_{uniformity} = \frac{1}{N^2}\sum_{i=1}^{N}\sum_{j=1}^{N}\exp(-t\cdot(1-e_i\cdot e_j))$$

where:

L_{uniformity} is the uniformity loss;

$e_i$ and $e_j$ are normalized embedding vectors (i.e., $\|e_i\|=1$ and $\|e_j\|=1$);

$1-e_i\cdot e_j$ is the cosine distance between embeddings $e_i$ and $e_j$; and t is a temperature parameter that controls the sensitivity of the loss to pairwise distances (t>0).

Contrastive loss can represent the similarity of similar vector embeddings and the dissimilarity of dissimilar vector embeddings in a vector embedding space. Contrastive loss tries to minimize the distance between similar vector embedding pairs (e.g., similar question pairs 830) and maximize the distance between dissimilar vector embedding pairs (e.g., dissimilar question pairs 930). Contrastive loss can be represented by the following formula:

$$L_{contrastive} = \frac{1}{N}\sum_{i=1}^{N}\left[y_i\cdot d_i^2 + (1-y_i)\cdot\max(0, m-d_i)^2\right]$$

where:

N is the total number of sample pairs;

$y_i$ indicates whether the pair is similar if $y_i=1$ or dissimilar if $y_i=0$;

$d_i$ is the distance between the embeddings of the pair (cosine or Euclidian); and m is the margin, a threshold beyond which dissimilar pairs are not penalized.

During training, the similar question pairs 830 and dissimilar question pairs 930 can be used as positive and negative examples (i.e., semantically similar vector embeddings and semantically dissimilar vector embeddings). A contrastive loss, uniformity loss, and/or density loss can be calculated for the similar question pairs 830 and dissimilar question pairs 930. Various parameters of the custom vector embedding model 1000 (e.g., weights, biases and/or hyperparameters) can be iteratively adjusted to minimize the contrastive loss, uniformity loss, and/or density loss. The losses may also be back propagated through the model to determine an loss gradient. The gradient can be used determine parameter adjustments to minimize the losses. Various optimization algorithms can be employed to determine the parameter adjustments to minimize the losses based on the loss gradient.

Figure 12:
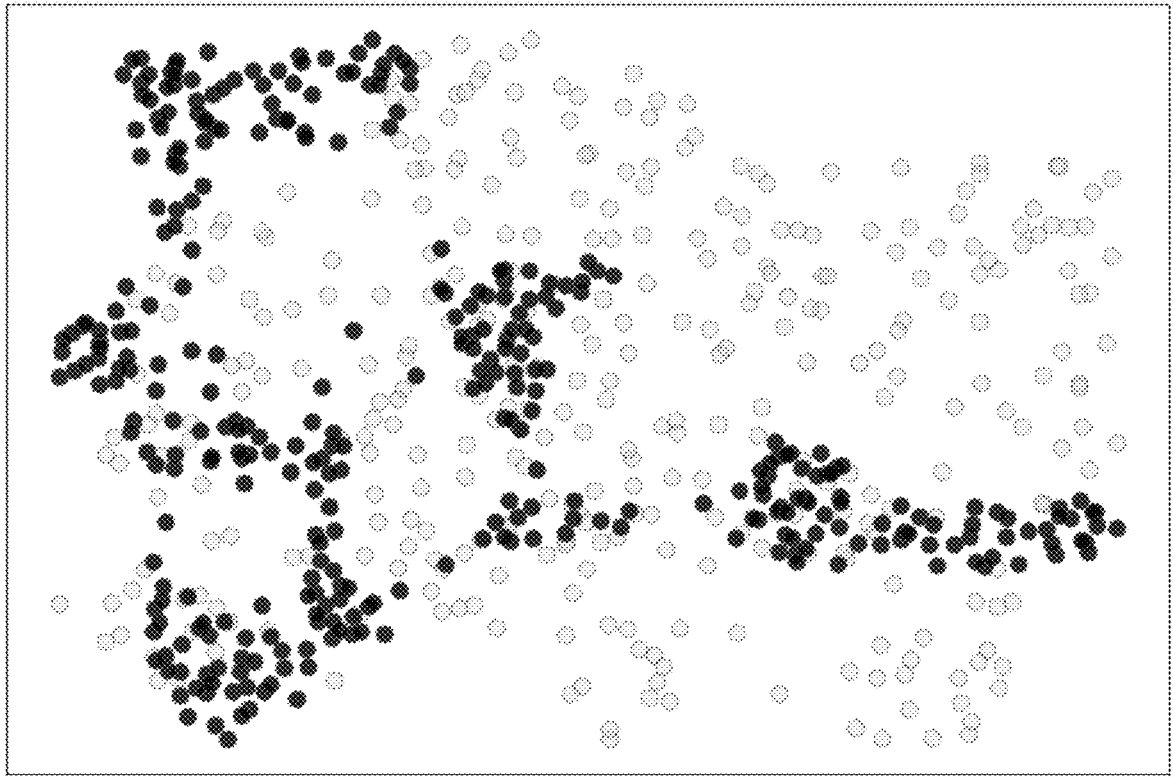

Reference will now be made to FIGS. 11-16 to illustrate the performance of a custom vector embedding model 1000 in comparison to a default vector embedding model 420. FIGS. 11 and 12 show a plurality of example questions pertaining to telematics topics being reprojected into a custom vector embedding space by a custom vector embedding model 1000. As shown, the custom vector embedding model 1000 transforms default vector embeddings into custom vector embeddings by remapping them from a default vector embedding space to a custom vector embedding space. In the custom vector embedding space, the questions are no longer evenly dispersed across the vector embedding space. Instead, the questions are grouped together into clusters based on semantic similarity.

Figure 13:
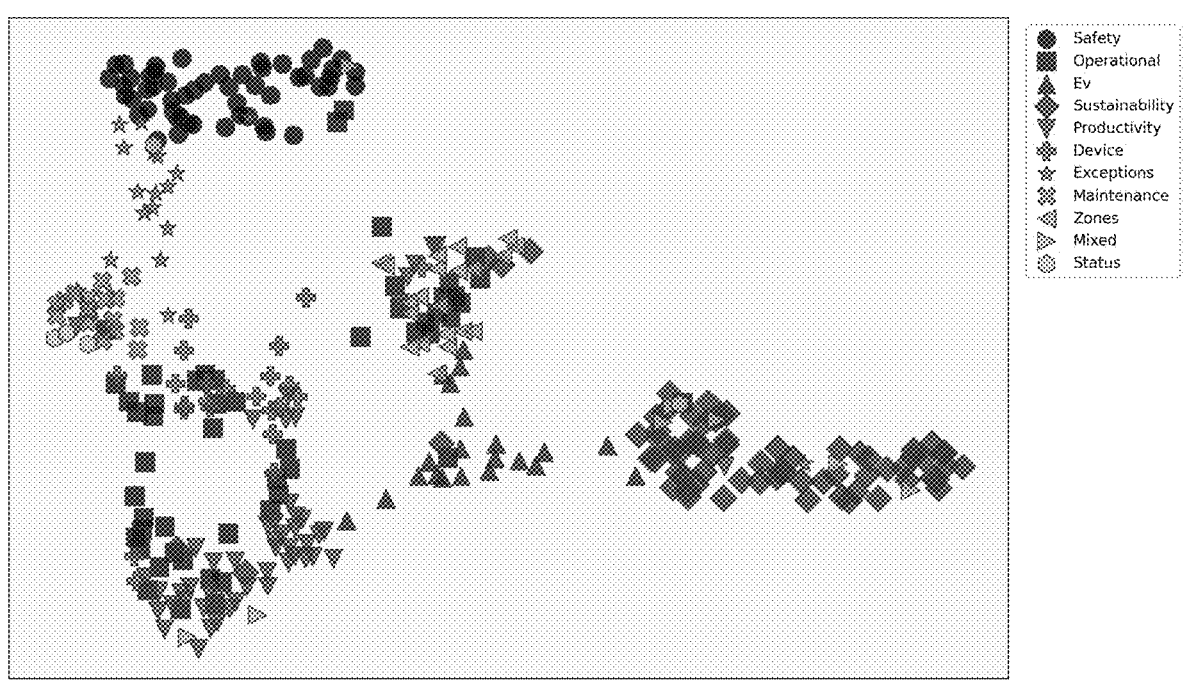
FIGS. 13 and 14 are graphs of example custom vector embeddings of example user questions in an example custom vector embedding space, in accordance with an embodiment.
Figure 14:
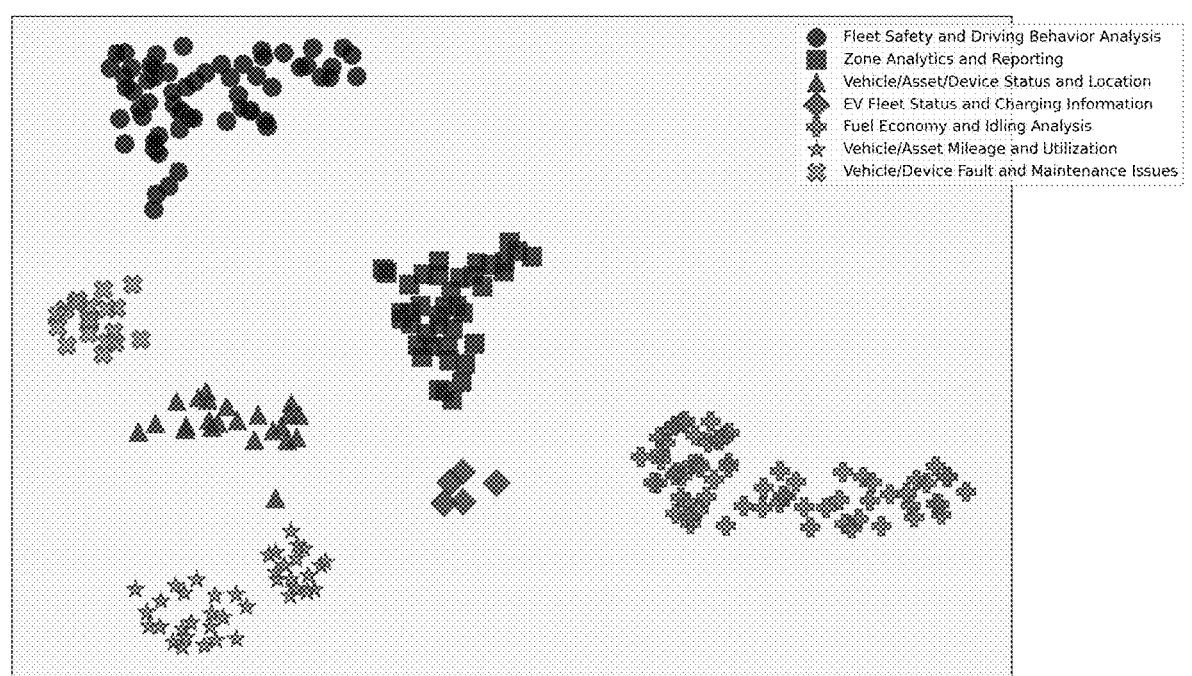

FIGS. 13 and 14 show a plurality of example questions pertaining to telematics topics in the custom vector embedding space of a custom vector embedding model 1000. As shown, various clusters can be defined in the custom vector embedding space. However, some of the topics are not well represented by the clusters in FIG. 13. The inventors recognized and realized that the custom vector embedding model 1000 could be further refined by retraining the custom vector embedding model 1000 based on these clusters. As shown, a large language model 430 can be used to assign one or more cluster topics to each cluster. The custom vector embedding model 100 can be retrained by adjusting the hyperparameters of the model based on the clusters and the cluster labels. FIG. 13 shows the custom vector embedding space before the retraining and FIG. 14 shows the custom vector embedding space after the retraining. As shown, after the retraining, all of the cluster topics are well represented by the clusters.

Figure 15:
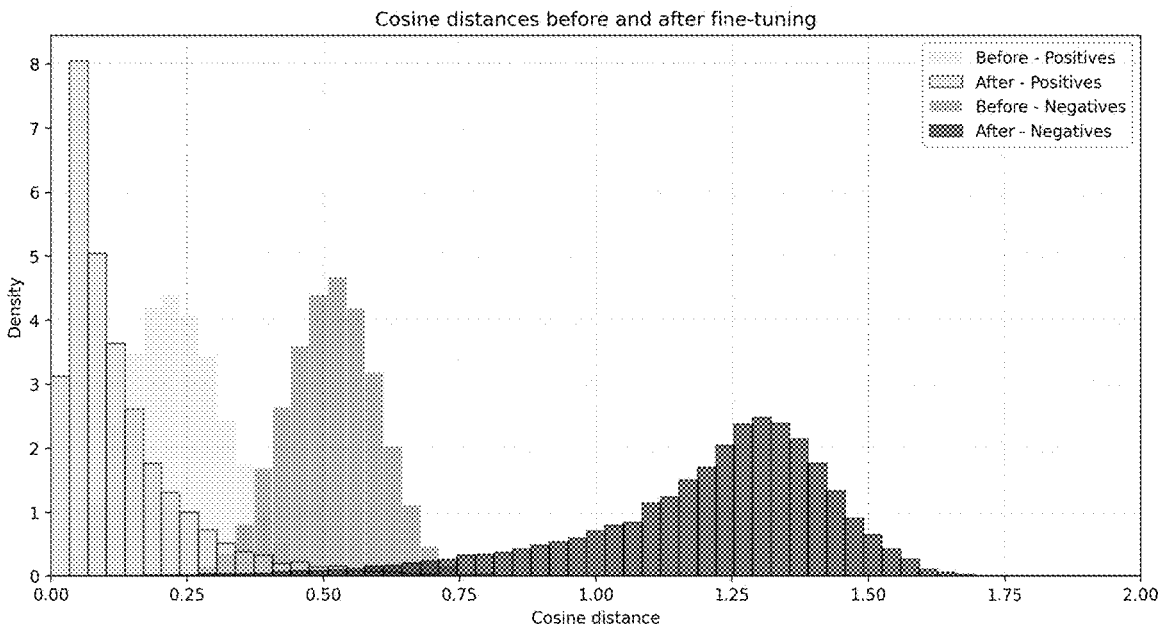
FIG. 15 is a graph of cosine distances of example similar question pairs and dissimilar question pairs before and after reprojection into an example custom vector embedding space, in accordance with an embodiment.

FIG. 15 shows a distribution of the pairwise distances of the similar question pairs 830 and dissimilar question pairs 930 in the default vector embedding space (e.g., before being reprojected by the custom vector embedding model 1000) and in the custom vector embedding space (e.g., after being reprojected by the custom vector embedding model 1000). As shown, prior to reprojection, although the similar question pairs 830 and dissimilar question pairs 930 have some separation, they only occupy a small portion of the default vector embedding space and have significant overlap. After the reprojection, the similar question pairs 830 and dissimilar question pairs 930 are better separated, occupy a larger portion of the custom vector embedding space, and have less overlap. In other words, the custom vector embedding model 1000 has reprojected the default vector embeddings into more of the embedding space, grouped similar questions closer together, and pushed dissimilar questions farther apart. Put another way, a majority of dissimilar question pairs 930 are further apart in the custom vector embedding space of the custom vector embedding model 1000 than in a default vector embedding space of the default vector embedding model 420, and a majority of similar question pairs 920 are closer together in the custom vector embedding space of the custom vector embedding model 1000 than in the default vector embedding space of the default vector embedding model 420.

Figure 16:
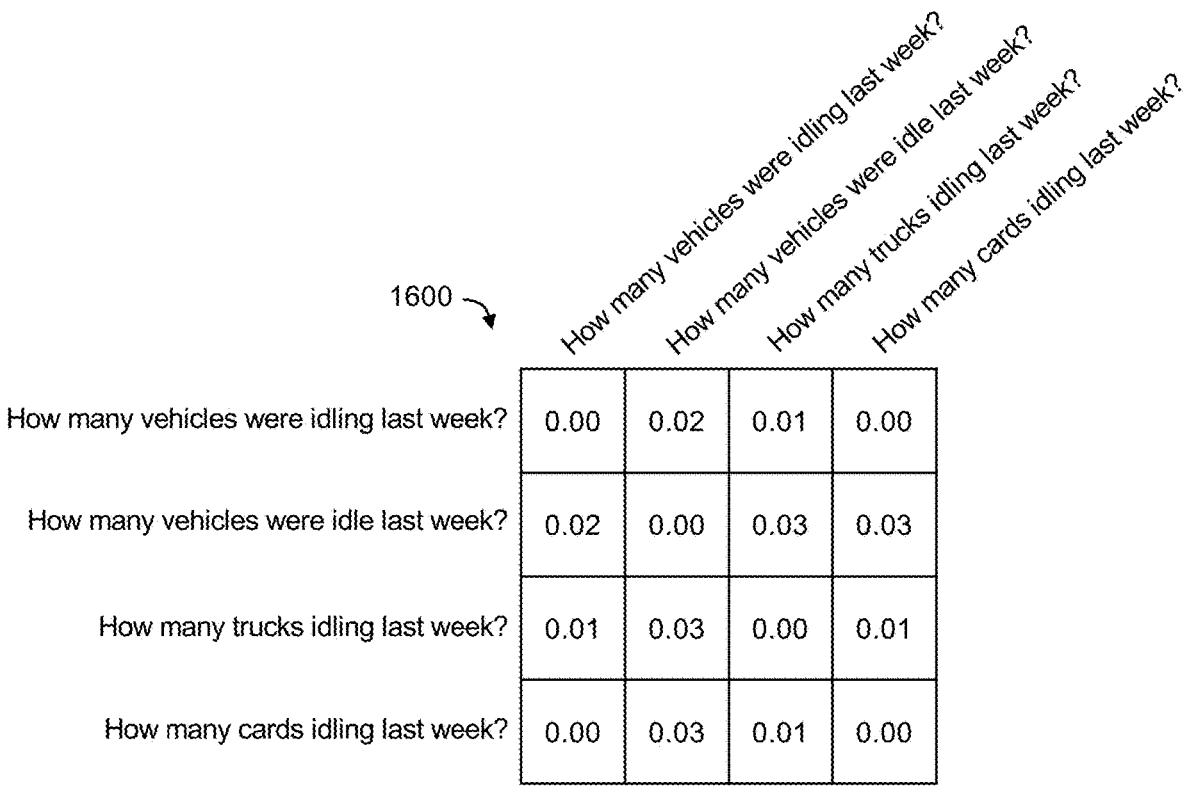
FIG. 16 is a distance matrix of example user questions in an example custom vector embedding space, in accordance with an embodiment.

FIG. 16 shows another distance matrix 1600 for a plurality of example user questions pertaining to telematics. The distance matrix 1600 shows the distance between the questions in the custom vector embedding space after being reprojected by the custom vector embedding model 1000. As shown, all of the semantically similar questions have almost zero pairwise distance, demonstrating a significant improvement in performance by the custom vector embedding model 1000 compared to the default vector embedding model 420 (i.e., shown in FIG. 6).

Figure 17:
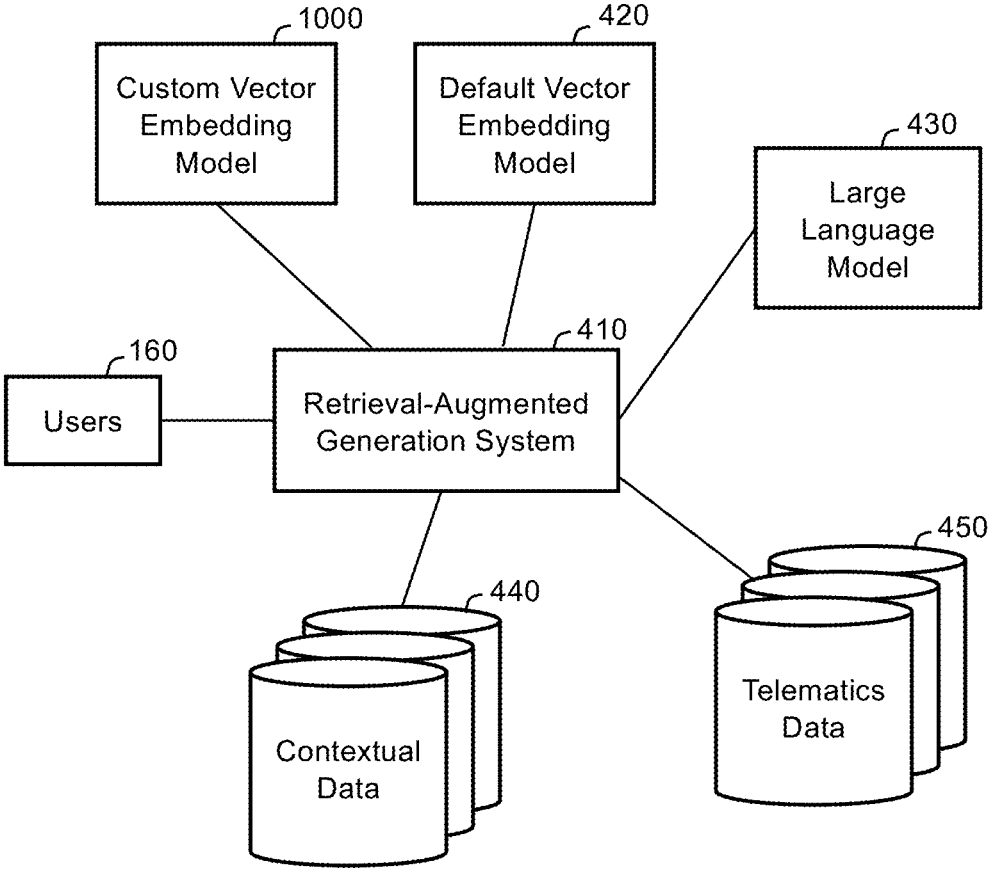
FIG. 17 is a block diagram of an example retrieval-augmented generation system interacting an example custom vector embedding model and other components, in accordance with an embodiment.

Referring now to FIG. 17, there is shown another example retrieval-augmented generation system 410. The retrieval-augmented generation system 410 shown in FIG. 17 is similar in function to the retrieval-augmented generation system 410 shown in FIG. 4, except that it uses a custom vector embedding model 1000, instead of solely relying on a default vector embedding model 420. In this manner, the retrieval-augmented generation system 410 can identify and retrieve contextual data that is more relevant to user questions containing domain-specific language, such as, but not limited to, telematics, which can improve the quality of response generation by the large language model 430. As described herein, the retrieval-augmented generation system 410 can be implemented by one or more processors executing instructions stored on one or more data storages, such as, but not limited to, fleet management system 110 and/or computing device 150.

In operation, the retrieval-augmented generation system 410 can receive a user question and use a default vector embedding model 420 to generate a default vector embedding for the user question, use a custom vector embedding model 1000 to generate a custom vector embedding for the user question based on default vector embedding, retrieve contextual data 440 based on the custom vector embedding, generate a contextualized prompt based on the user question and the contextual data, and prompt a large language model 430 using the contextualized prompt to generate a response to the user question. In this manner, the large language model 430 can generate responses to user questions containing domain-specific language, such as, but not limited to, telematics, and support conversational interactions with users 160, which can be more intuitive, faster, and more accessible than navigating through conventional user interface elements, such as buttons, menus, forms, etc.

The custom vector embedding model 1000 can generate a custom vector embedding based on a default vector embedding (e.g., generated by the default vector embedding model 420 based on the user question). The custom vector embedding can be better suited to represent domain-specific language, such as, but not limited to, telematics, than the default vector embedding. The custom vector embedding can include an array of numbers, with each number corresponding to a dimension in the custom vector embedding space. Each number in the array can represent a strength of association with a dimension, and each dimension can represent one or more semantic concepts. As described herein, the custom vector embedding model 1000 can be a machine learning or artificial intelligence model, including, but not limited to, an artificial neural network, that is trained to reproject default vector embeddings into a custom vector embedding space, without being explicitly programmed to do so.

The custom vector embedding can be used to identify and retrieve contextual data 440. For example, various contextual data 440 can also be represented as custom vector embeddings, and a similarity search can be performed to find the contextual data 440 most relevant to the user question. In other words, the user question custom vector embedding can be compared to a plurality of contextual data custom vector embeddings to identify one or more contextual data custom vector embeddings that are most similar to the user question custom vector embedding. In some cases, the contextual data custom vector embeddings may also be compared to minimize similarity therebetween, while maximizing similarity to the user question custom vector embedding. The identified contextual data custom vector embeddings can be used to retrieve the relevant contextual data 440.

Various metrics can be used to determine similarity or dissimilarity between custom vector embeddings. In some embodiments, a cosine similarity can be calculated for the custom vector embeddings. The cosine similarity can represent the cosine of the angle between the custom vector embeddings. In other embodiments, a Euclidean distance can be calculated for the custom vector embeddings. The Euclidean distance can represent a length of a line segment between the custom vector embeddings.

As described herein, a contextualized prompt can be generated based on the user question and the retrieved contextual data 440. The contextualized prompt can include some or all of the user question and the retrieved contextual data 440. The large language model 430 can be prompted using the contextualized prompt to generate a response to the user question. The response received from the large language model 430 can include one or more executable database queries. The executable database queries can be used to retrieve telematics data 450 related to the user question. In this manner, the user questions can be responded to without the large language model 430 accessing the telematics data 450.

The response generated by the large language model 430 can be provided to the user 160. In this manner, the user question can be responded to without tuning the default vector embedding model 420 with respect to domain-specific language, such as, but not limited to, telematics. Instead, as described herein, a custom vector embedding model 1000 can be employed. In some embodiments, when the response generated by the large language model 430 includes at least one executable database query, the executable database query can be executed to retrieve data related to the user question, and at least a portion of the retrieved data can be provided to the user 160. In some embodiments, the at least one executable database query can be provided to the user 160. This can allow the user 160 to troubleshoot potential errors in data retrieval caused by the query.

Figure 18:
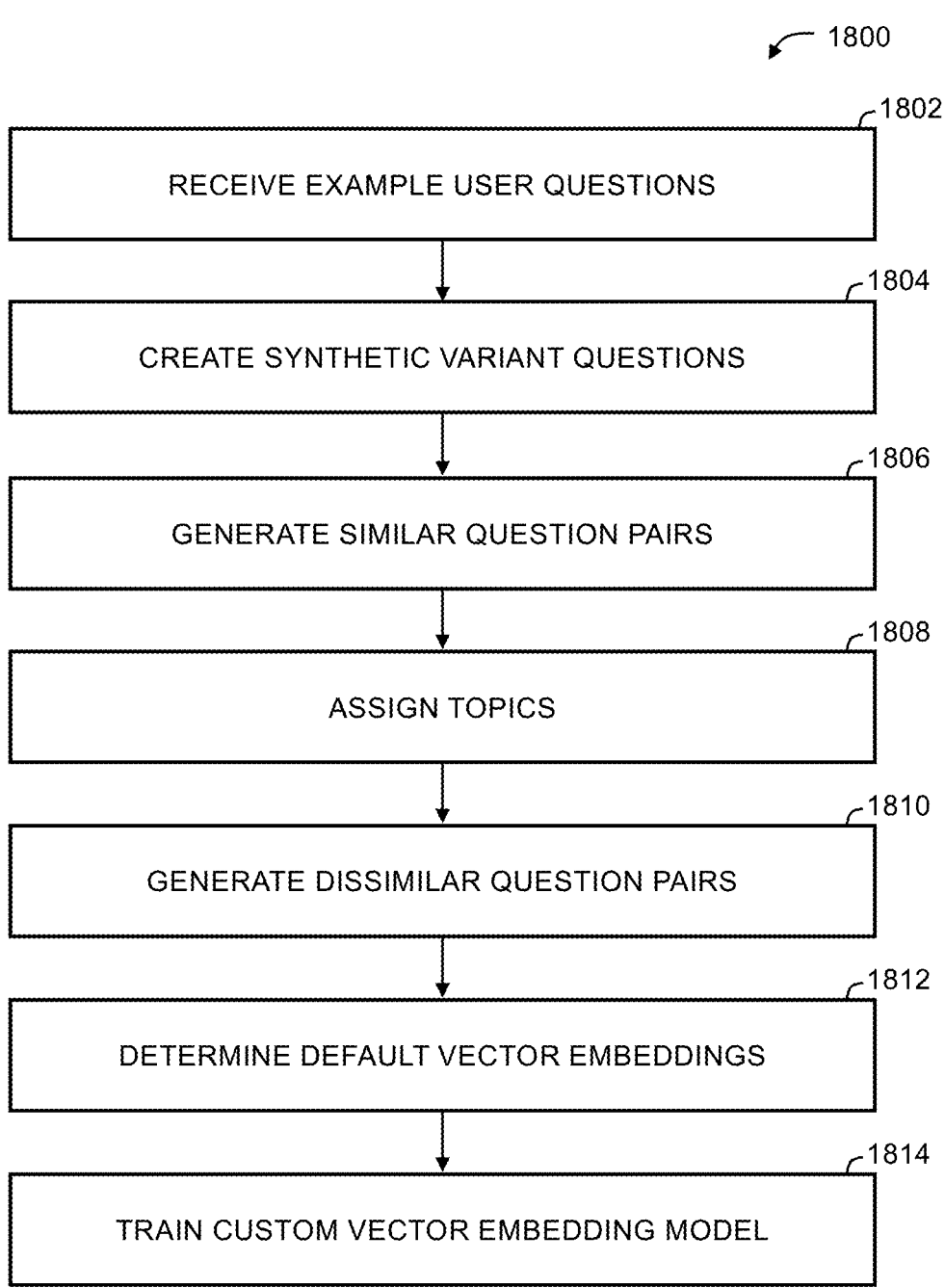
FIG. 18 is a flowchart of an example method for training a custom vector embedding model, in accordance with an embodiment.

Referring now to FIG. 18, there is shown an example method 1800 for training a custom vector embedding model 1000. Custom vector embedding method 1800 can be used to train a custom vector embedding model 1000 to reproject default vector embeddings into custom vector embedding suited for domain-specific language, without explicitly programming it to do so. Custom vector embedding method 1800 can be implemented using one or more processors executing instructions stored on one or more data storages, such as, but not limited to, fleet management system 110 and/or computing device 150.

At 1802, a plurality of example user questions 810 can be received. The example user questions 810 can be received in various natural language or textual data formats. Each example user question 810 may include one or more sentences, phrases, paragraphs, words, characters, etc. Each example user question 810 may include one or more requests, commands, instructions, queries, etc. The example user questions 810 can include domain-specific language, such as, but not limited to, telematics. The example user questions 810 may relate to telematics data originating from a plurality of telematics devices 130 installed in a plurality of vehicles 120. For example, the example user questions 810 may include, "Which vehicles in my fleet operated the least?", "Compare our fleet safety risk to last year.", "Which vehicles currently have active or pending fault codes?", "How many gallons of fuel were used last month?", "What is the most common rule broken?", etc. The example user questions 810 can be written, selected, or curated by a human, as opposed to being synthetic, artificial, or computer-generated.

At 1804, a plurality of synthetic variant questions 820 can be created. A large language model 430 can be used to create the synthetic variant questions 820 based on the plurality of the example user questions 810. Each synthetic variant question 820 can correspond to an example user question 810. A plurality of synthetic variant questions 820 can be generated for each example user question 810. The synthetic variant questions 820 can also contain domain-specific language, such as, but not limited to, telematics. The synthetic variant questions 820 can also relate to telematics data originating from a plurality of telematics devices 130 installed in a plurality of vehicles 120.

Each synthetic variant question 820 can vary from the example user question 810 that it was created based on, while retaining semantic similarity. For example, the example user question 810 "What is the GPS top speed in each zone?" may be used to create the synthetic variant questions 820 "What was the GPS top speed in each zone this week?", "Which zone had vehicles exceeding 80 mph in the last 30 days?", "Can you give me a report of top speeds for all busses in all my Zones?", "What's the highest speed recorded for my vehicles in California last week?", "I need the top GPS speeds for trucks in Zone B yesterday.", "Give me a list of the top 5 GPS speeds recorded in Zone F over the past week.", and "What was the maximum speed in a zone last Tuesday?" using a large language model 430. Each synthetic variant question 820 can vary or differ from the corresponding example user question 810 in one or more ways. In other words, each synthetic variant question 820 can include one or more variations. As described herein, the variations may include conceptual, entity, grammatical, linguistic, numerical, specificity, and/or temporal variations.

At 1806, a plurality of similar question pairs 830 can be generated. The plurality of similar question pairs 830 can be generated using the plurality of example user questions 810 and the plurality of synthetic variant question 820. Each similar question pair 830 can include two semantically similar questions. A similar question pair 830 may include an example user question 810 and a synthetic variant question 820 corresponding to the example user question 810, or two synthetic variant questions 820 corresponding to the same example user question 810. For example, a similar question pair 830 may include "What is the GPS top speed in each zone?" and "What was the GPS top speed in each zone this week?". As another example, a similar question pair 830 may include "Which zone had vehicles exceeding 80 mph in the last 30 days?" and "Can you give me a report of top speeds for all busses in all my Zones?".

At 1808, a plurality of topics can be assigned to the plurality of example user questions 810 and the plurality of synthetic variant questions 820. A large language model 430 can be used to assign the topics. At least one topic can be assigned to each example user question 810 and each synthetic variant question 820. Each topic can represent a subject, concept, or matter of the example user question 810 or synthetic variant question 820. For example, example user question 810 "What is the GPS top speed in each zone?" and synthetic variant question 820 "What was the GPS top speed in each zone this week?" can each be assigned the topics "Speed", "Geospatial", and "Zones".

At 1810, a plurality of dissimilar question pairs 930 can be generated. The plurality of dissimilar question pairs 930 can be generated using the plurality of example user questions 810, the plurality of synthetic variant questions 820, and the plurality of topics. Each dissimilar question pairs 930 can have no topics in common. In other words, each dissimilar question pair 930 can include two semantically dissimilar questions. For example, "What is the GPS top speed in each zone?" having assigned topics "Speed", "Geospatial", and "Zones" may be paired with "Which vehicles have the best fuel economy this month?" having assigned topics "Fuel" and "Sustainability" to form a dissimilar question pair 930. On the other hand, "What is the GPS top speed in each zone?" and "What was the GPS top speed in each zone this week?" may not be paired as a dissimilar question pair 930 because they have the topics "Speed", "Geospatial", and "Zones" in common. Likewise, "What is the GPS top speed in each zone?" and "How many vehicles performed harsh braking in zone A?" may not be paired as a dissimilar question pair 930 because they have the at least one topic in common, "Zones". A dissimilar question pair 930 can include two example user questions 810 with no common topics, an example user question and 810 and a synthetic variant question 820 with no common topics, or two synthetic variant questions 820 with no common topics.

At 1812, a plurality of default vector embeddings can be determined using a default vector embedding model 420. A pair of default vector embeddings can be determined for each similar question pair 830 and each dissimilar question pair 930 (e.g., for the respective example user questions 810 and/or synthetic variant questions 820). As described herein, each default vector embedding can numerically represent the semantic meaning of an example user question or synthetic variant question. The default vector embedding can include an array of numbers, with each number corresponding to a dimension in the default vector embedding space. Each number in the array can represent a strength of association with a dimension, and each dimension can represent one or more semantic concepts.

As described herein, the default vector embedding model 420 can include any suitable machine learning or artificial intelligence model, including, but not limited to, an artificial neural network and/or a generative pretrained transformer. The default vector embedding model 420 can be a commercial model, such as, but not limited to, Google Gemini™ embedding models (e.g., gemini-embedding-exp-03-07, text-embedding-004, or embedding-001) or OpenAI™ embedding models (e.g., text-embedding-3-large, text-embedding-ada-002, or text-embedding-3-small).

At 1814, a custom vector embedding model 1000 can be trained. The custom vector embedding model 1000 can be trained using the default vector embeddings of the similar question pairs 830 and dissimilar question pairs 930. The similar question pairs 830 can be used as positive examples (i.e., semantically similar questions), whereas the dissimilar question pairs 930 can be used as negative examples (i.e., semantically dissimilar questions). The custom vector embedding model 1000 can be trained based on differences between the default vector embeddings of the similar question pairs 830 and the dissimilar question pairs 930. For example, the custom vector embedding model 1000 may be trained to minimize a contrastive loss, uniformity loss, and/or density loss.

As described herein, training the custom vector embedding model 1000 can involve iteratively adjusting various parameters of the custom vector embedding model 1000 to minimize error or loss. The error of the custom vector embedding model 1000 can be determined based on contrastive loss, uniformity loss, and/or density loss. The error can be a weighted sum of one or more of these losses, and the weights of the losses can be a hyperparameter that can be adjusted during training. For an artificial neural network, the adjusted parameters can include the weights and biases of nodes or neurons, as well as hyperparameters, such as, epochs, batch size, learning rate, gradient clipping, stopping threshold, loss margin, density regularization weight, hard negative mining weight, optimizer selection, etc. In some cases, errors or losses also be back propagated through the neural network to determine an error gradient. The gradient can be used determine parameter adjustments to minimize the errors. Various optimization algorithms can be employed to determine the parameter adjustments to minimize the errors based on the gradient.

Once trained, the custom vector embedding model 1000 can reproject default vector embeddings into a custom vector embedding space suitable for representing domain-specific language. In other words, the custom vector embedding model 1000 can transform default vector embeddings (e.g., from a default vector embedding model 420) into custom vector embeddings. The custom vector embeddings can better represent the semantic meaning of user questions containing domain-specific language as compared to the default vector embeddings. It should be appreciated that the custom vector embedding model 1000 is not explicitly programmed to generate custom vector embeddings. Instead, the custom vector embedding model 1000 is trained to generate custom vector embeddings using various positive and negative examples of semantically similar and dissimilar default vector embeddings.

Figure 19:
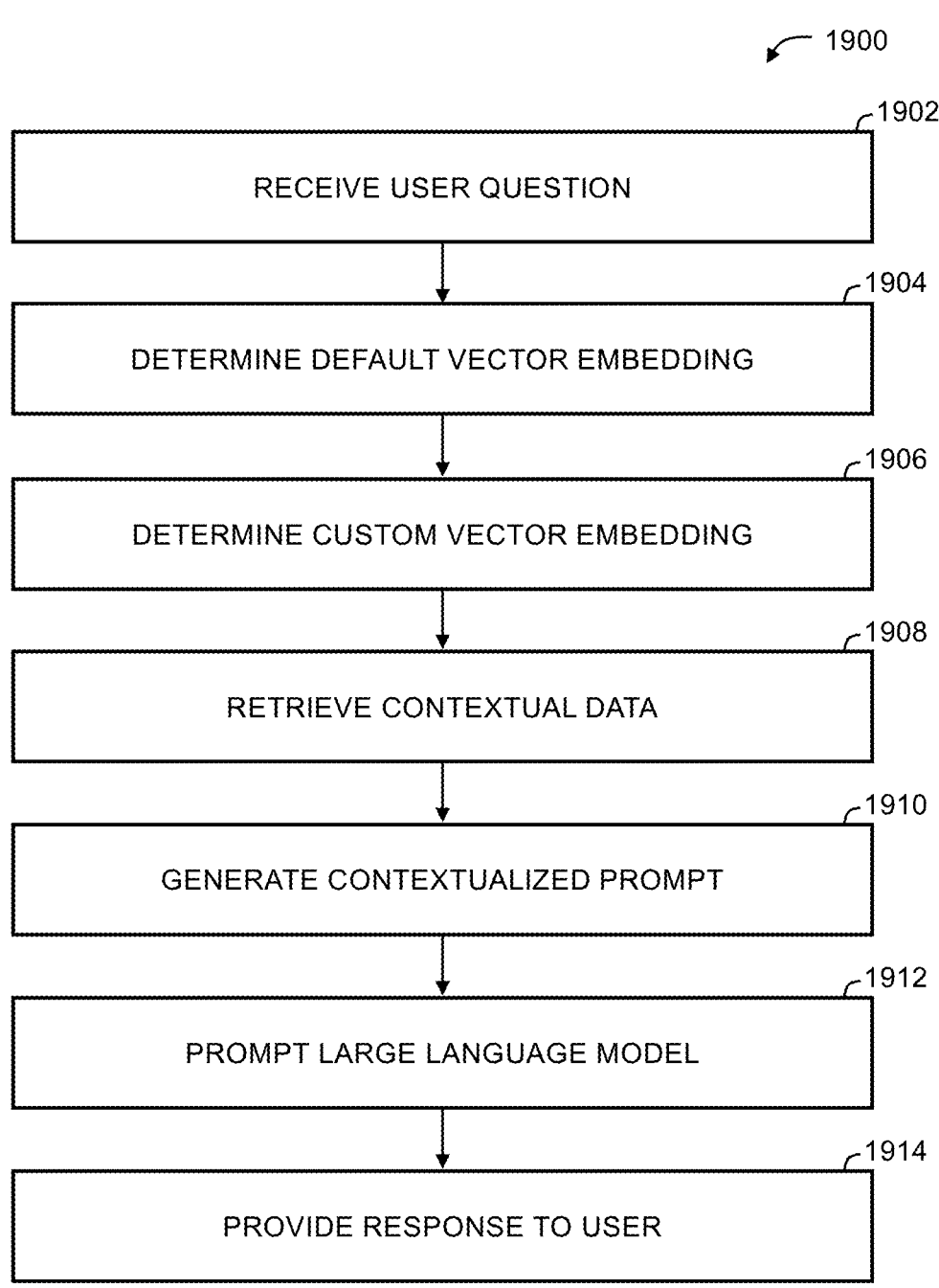
FIG. 19 is a flowchart of an example method for using a custom vector embedding model, in accordance with an embodiment.

Referring to FIG. 19, there is shown an example method 1900 for using a custom vector embedding model 1000. Custom vector embedding method 1900 can be used to generate responses to user questions using custom vector embeddings that better represent domain-specific language, such as, but not limited to, telematics, as compared to default vector embeddings. Custom vector embedding method 1900 can be implemented using one or more processors executing instructions stored on one or more data storages, such as, but not limited to, fleet management system 110 and/or computing device 150.

At 1902, a user question can be received. As described herein, the user question can be received from a computing device 150 associated with a user 160. The user question can be received in various natural language or textual data formats. The user question may include one or more sentences, phrases, paragraphs, words, characters, etc. The user question may include one or more requests, commands, instructions, queries, etc. The user question can include domain-specific language, such as, but not limited to telematics. The user question may relate to telematics data originating from one or more telematics devices 130 installed in one or more of vehicles 120. For example, the user question may include, "Which vehicles in my fleet operated the least?", "Compare our fleet safety risk to last year.", "Which vehicles currently have active or pending fault codes?", "How many gallons of fuel were used last month?", "What is the most common rule broken?", etc.

At 1904, a default vector embedding for the user question can be determined. As described herein, the default vector embedding can be determined using a default vector embedding model 420. The default vector embedding can numerically represent the semantic meaning of the user question. The default vector embedding can include an array of numbers, with each number corresponding to a dimension in the default vector embedding space. Each number in the array can represent a strength of association with a dimension, and each dimension can represent one or more semantic concepts. The default vector embedding model 420 can include any suitable machine learning or artificial intelligence model, including, but not limited to, an artificial neural network and/or a generative pretrained transformer. The default vector embedding model 420 can be a commercial model, such as, but not limited to, Google Gemini™ embedding models (e.g., gemini-embedding-exp-03-07, text-embedding-004, or embedding-001) or OpenAI™ embedding models (e.g., text-embedding-3-large, text-embedding-ada-002, or text-embedding-3-small).

At 1906, a custom vector embedding can be determined for the user question. The custom vector embedding can be determined using a custom vector embedding model 1000 based on the default vector embedding. As described herein, the custom vector embedding can be better suited to represent domain-specific language than the default vector embedding. For example, the custom vector embedding space may be less compressed, more uniformly distributed, more clusterable, and/or have better contrast between semantically dissimilar concepts. The custom vector embedding model 1000 can be any suitable machine learning or artificial intelligence model, including, but not limited to, an artificial neural network. The custom vector embedding model 1000 can be trained to reproject default vector embeddings into a custom vector embedding space suitable for representing domain-specific language. The custom vector embedding model 1000 can be trained using various synthetic questions generated by a large language model 430. The synthetic questions can be used as negative or positive examples (e.g., semantically similar or dissimilar questions).

At 1908, contextual data 440 associated with the user question can be retrieved. The contextual data 440 can be retrieved based on the custom vector embedding. As described herein, the custom vector embedding can be used to identify and retrieve contextual data 440 that is relevant to the user question. For example, various contextual data 440 can also be represented as custom vector embeddings, and a similarity search can be performed to find the contextual data 440 most relevant to the user question. In other words, the user question custom vector embedding can be compared to a plurality of contextual data custom vector embeddings to identify one or more contextual data custom vector embeddings that are most similar to the user question custom vector embedding. In some cases, the contextual data custom vector embeddings may also be compared to minimize similarity, while maximizing similarity to the user question custom vector embedding. The identified contextual data custom vector embeddings can be used to retrieve the relevant contextual data 440. Various metrics can be used to determine similarity or dissimilarity between custom vector embeddings, such as, but not limited to, cosine similarity and Euclidean distance.

As described herein, the contextual data 440 can include various information for enhancing or augmenting the user question. In general, the contextual data 440 can include any information that can help a large language model 430 clarify, understand, or interpret the user question. The contextual data 440 can also include information that can help the large language model 430 make inferences or assumptions. For example, the contextual data 440 may include example user questions and example desired outputs from the large language model 430. The contextual data 440 may also include various definitions, explanations, and background information. Other examples of contextual data 440 may include preferred units of measure, previous user history, current date and time, etc. In some embodiments, the contextual data 440 may include at least one executable database query corresponding to the user question.

At 1910, a contextualized prompt can be generated for a large language model 430. The contextualized prompt can be generated based on the user question and the retrieved contextual data. As described herein, the contextualized prompt can include some or all of the user question and the retrieved contextual data 440. For example, the contextualized prompt for the user question "Which vehicles in my fleet operated the least" may include the user question, at least one executable database query for retrieving telematics data related to usage of the vehicles 120 in the user's fleet, and definitions for the terms "vehicles", "fleet", and "operated".

At 1912, a large language model 430 can be prompted using the contextualized prompt to generate a response to the user question. As described herein, the large language model 430 can include any suitable machine learning or artificial intelligence model, including, but not limited to, an artificial neural network and/or a generative pretrained transformer. The large language model 430 can be a commercial model, such as, but not limited to, Google Gemini™, OpenAI ChatGPT™, Meta Llama™, and/or DeepSeek™. The response received from the large language model 430 can include one or more executable database queries. The executable database queries can be used to retrieve telematics data 450 related to the user question. In this manner, the user questions can be responded to without the large language model 430 accessing the telematics data.

At 1914, at least a portion of the response generated by the large language model 430 can be provided to the user 160. In this manner, the user question can be responded to without tuning the default vector embedding model 420 to understand the semantic meaning of domain-specific language, such as, but not limited to, telematics. In some embodiments, when the response generated by the large language model 430 includes at least one executable database query, the executable database query can be executed to retrieve data related to the user question, and at least a portion of the retrieved data can be provided to the user 160. In some embodiments, the at least one executable database query can be provided to the user 160.

Figure 20:
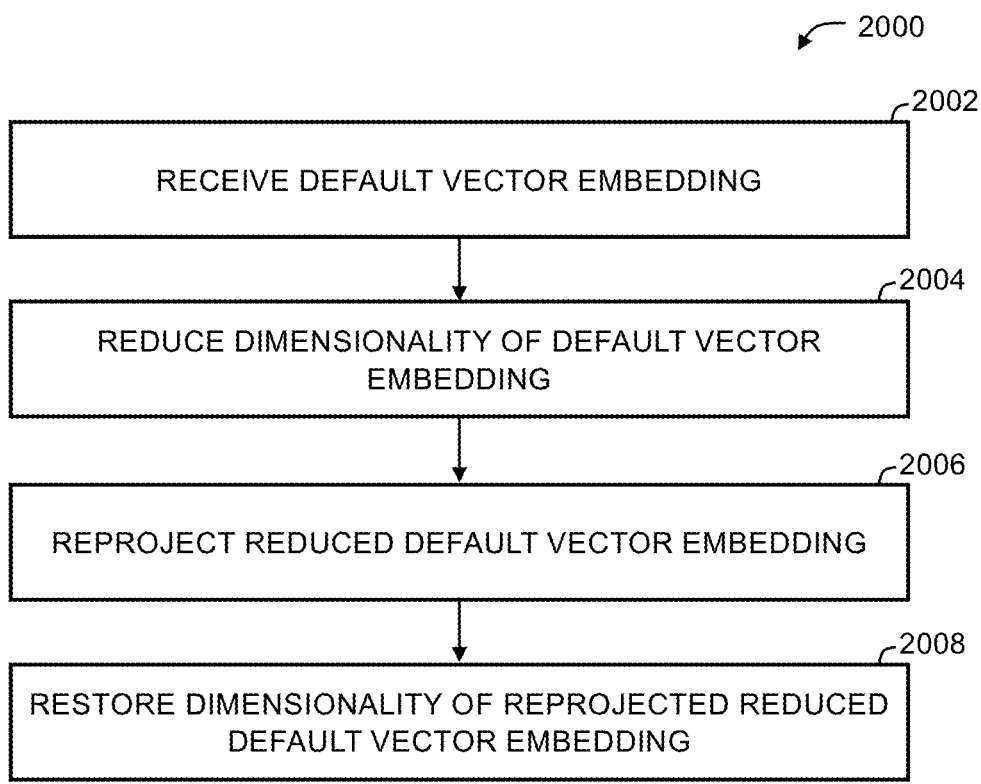
FIG. 20 is a flowchart of an example method for generating custom vector embeddings, in accordance with an embodiment.

Referring now to FIG. 20, there is shown another example method 2000 for generating custom vector embeddings. Custom vector embedding method 2000 can be used to reproject default vector embeddings into a custom vector embedding space suitable for representing the semantic meaning of domain-specific language, such as, but not limited to, telematics. Custom vector embedding method 2000 can be implemented using one or more processors executing instructions stored on one or more data storages, such as, but not limited to, fleet management system 110 and/or computing device 150.

At 2002, a default vector embedding for a user question can be received. For example, initial sequence block 1010 can receive the default vector embedding. As described herein, the default vector embedding can represent a user question containing domain-specific language, such as telematics, and be generated by a default vector embedding model 420. The default vector embedding can numerically represent the semantic meaning of the user question. The default vector embedding can include an array of numbers, with each number corresponding to a dimension in the default vector embedding space. Each number in the array can represent a strength of association with a dimension, and each dimension can represent one or more semantic concepts.

At 2004, the dimensionality of the default vector embedding can be reduced to generate a reduced default vector embedding. For example, initial sequence block 1010 can reduce the dimensionality of the default vector embedding. In this manner, the reduced default vector embedding can be a vector of smaller size or having fewer dimensions than the original default vector embedding. Various functions or operations can be executed to reduce the dimensionality of the default vector embedding. For example, reducing the dimensionality of the default vector embedding may involve one or more linear transformations and/or layer normalizations.

At 2006, the reduced default vector embedding can be reprojected to generate a reprojected reduced default vector embedding. For example, residual block 1020 can reproject the reduced default vector embedding. In this manner, the reduced default vector embedding can be reprojected into a custom embedding space suited for the domain-specific language. Various functions or operations can be executed to reproject the reduced default vector embedding. For example, reprojecting the reduced default vector embedding may involve one or more layer normalizations, parametric rectified linear unit activations, linear transformations, and/or dropout regularizations.

At 2008, the dimensionality of the reprojected reduced default vector embedding can be restored to output a custom vector embedding. For example, output sequential block 1030 can restore the dimensionality of the reprojected reduced default vector embedding. In this manner, the custom vector embedding can be a vector of large size or having more dimensions than the reprojected reduced default vector embedding. Various functions or operations can be executed to restore the dimensionality of the reprojected reduced default vector embedding. For example, restoring the dimensionality of the reprojected reduced default vector embedding may involve one or more linear and/or hyperbolic tangent transformations. It should be appreciated that the custom vector embedding can be the same size, larger, or smaller than the default vector embedding.

In some embodiments, the custom vector embedding model 1000 can be an artificial neural network and receiving the default vector embedding at 2002, reducing the dimensionality of the default vector embedding, reprojecting the reduced default vector embedding, and restoring the dimensionality of the reprojected reduced default vector embedding can involve executing various layers of the neural network. That is, custom vector embedding method 2000 can involve passing the default vector embedding through a plurality of layers of a neural network to perform various calculations at a plurality of neurons to output a custom vector embedding.

FIG. 21 shows an example user interface 2100 associated with fleet management system 110. User interface 2100 can be rendered and displayed at a computing device 150 operated by a user 160. As shown, user interface 2100 can provide a user 160 with access to various telematics data managed by fleet management system 110. In particular, user interface 2100 can support conversational interactions with the user 160 regarding the telematics data. As shown, a user 160 can input user questions containing telematics-specific language and receive a response to the user questions. In the illustrated example, a user 160 has input the user question, "What is the GPS top speed in each zone?" As should be appreciated, the terms "GPS speed" and "zone" may have different meanings, depending on the context. In order to correctly respond to the user question, a custom vector embedding model 1000 can be utilized in accordance with the systems and methods described herein to capture the semantic meaning of the user question. As shown, despite the use of domain-specific language, the fleet management system 110 can provide an accurate response to the user question. In the illustrated example, the response includes a table of the top 10 zones having the highest top GPS speeds. As shown, user interface 2100 can support user interactions that are more intuitive, faster, and more accessible than navigating through conventional user interface elements, such as buttons, menus, forms, etc. In this manner, user interface 2100 can function as a fleet management chatbot or artificial intelligence assistant.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device. Furthermore, the term "coupled" may indicate that two elements can be directly coupled to one another or coupled to one another through one or more intermediate elements.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Furthermore, any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). Programmable hardware such as FPGA can also be used as standalone or in combination with other devices. These devices may also have at least one input device (e.g., a pushbutton keyboard, mouse, a touchscreen, and the like), and at least one output device (e.g., a display screen, a printer, a wireless radio, and the like) depending on the nature of the device. The devices may also have at least one communication device (e.g., a network interface).

It should also be noted that there may be some elements that are used to implement at least part of one of the embodiments described herein that may be implemented via software that is written in a high-level computer programming language such as object-oriented programming. Accordingly, the program code may be written in C, C++ or any other suitable programming language and may comprise modules or classes, as is known to those skilled in object-oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

The invention claimed is:

1. A method for training a custom vector embedding model, the method comprising operating at least one processor to:

receive a plurality of example user questions containing domain-specific language;

use a large language model to create a plurality of synthetic variant questions based on the plurality of the example user questions, each synthetic variant question corresponding to an example user question;

generate a plurality of similar question pairs using the plurality of example user questions and the plurality of synthetic variant questions;

use the large language model to assign a plurality of topics to the plurality of example user questions and the plurality of synthetic variant questions, at least one topic being assigned to each example user question and each synthetic variant question;

generate a plurality of dissimilar question pairs using the plurality of example user questions, the plurality of synthetic variant questions, and the plurality of topics, each dissimilar question pair having no topics in common;

determine, using a default vector embedding model, default vector embeddings for each similar question pair and each dissimilar question pair; and train the custom vector embedding model based on differences between the default vector embeddings of each similar question pair and each dissimilar question pair, whereby the custom vector embedding model is operable to reproject default vector embeddings into a custom vector embedding space suitable for representing the domain-specific language.

2. The method of claim 1, wherein the custom vector embedding model is trained to maximize the differences between the default vector embeddings of each dissimilar question pair and minimize the differences between the default vector embeddings of each similar question pair.

3. The method of claim 1, wherein the custom vector embedding model is trained based on clusterability of the plurality of dissimilar question pairs and the plurality of similar question pairs in the custom vector embedding space.

4. The method of claim 1, wherein the custom vector embedding model is trained based on distribution uniformity of the plurality of dissimilar question pairs and the plurality of similar question pairs in the custom vector embedding space.

5. The method of claim 1, further comprising operating the at least one processor to:

determine a contrastive loss, a uniformity loss, and/or a density loss of the plurality of similar question pairs and the plurality of dissimilar question pairs based on the respective default vector embeddings;

wherein the custom vector embedding model is trained based on the contrastive loss, the uniformity loss, and/or the density loss.

6. The method of claim 1, wherein:

a majority of dissimilar question pairs are further apart in the custom vector embedding space of the custom vector embedding model than in a default vector embedding space of the default vector embedding model; and a majority of similar question pairs are closer together in the custom vector embedding space of the custom vector embedding model than in the default vector embedding space of the default vector embedding model.

7. The method of claim 1, further comprising operating the at least one processor to:

define a plurality of clusters in the custom vector embedding space;

use the large language model to assign a plurality of cluster topics to the plurality of clusters, each cluster being assigned at least one cluster topic; and retrain the custom vector embedding model by adjusting at least one hyperparameter of the custom vector embedding model based on the plurality of clusters and the plurality of cluster topics.

8. The method of claim 1, wherein each synthetic variant question comprises at least one variation from the corresponding example user question, the variation comprising at least one of: a conceptual variation, an entity variation, a grammatical variation, a linguistic variation, a numerical variation, a specificity variation and/or a temporal variation.

9. The method of claim 1, wherein at least two synthetic variant questions corresponding to the same example user question relate to two different fields stored in a common database table.

10. The method of claim 1, wherein the domain-specific language comprises terminology relating to telematics and the plurality of example user questions comprise questions relating to telematics data originating from a plurality of telematics devices installed in a plurality of vehicles.

11. A system for training a custom vector embedding model, the system comprising:

at least one data storage operable to store a plurality of example user questions containing domain-specific language; and at least one processor in communication with the at least one data storage, the at least one processor operable to:

receive the plurality of example user questions;

use a large language model to create a plurality of synthetic variant questions based on the plurality of the example user questions, each synthetic variant question corresponding to an example user question;

generate a plurality of similar question pairs using the plurality of example user questions and the plurality of synthetic variant questions;

use the large language model to assign a plurality of topics to the plurality of example user questions and the plurality of synthetic variant questions, at least one topic being assigned to each example user question and each synthetic variant question;

generate a plurality of dissimilar question pairs using the plurality of example user questions, the plurality of synthetic variant questions, and the plurality of topics, each dissimilar question pair having no topics in common;

determine, using a default vector embedding model, default vector embeddings for each similar question pair and each dissimilar question pair; and train the custom vector embedding model based on differences between the default vector embeddings of each similar question pair and each dissimilar question pair, whereby the custom vector embedding model is operable to reproject default vector embeddings into a custom vector embedding space suitable for representing the domain-specific language.

12. The system of claim 11, wherein the custom vector embedding model is trained to maximize the differences between the default vector embeddings of each dissimilar question pair and minimize the differences between the default vector embeddings of each similar question pair.

13. The system of claim 11, wherein the custom vector embedding model is trained based on clusterability of the plurality of dissimilar question pairs and the plurality of similar question pairs in the custom vector embedding space.

14. The system of claim 11, wherein the custom vector embedding model is trained based on distribution uniformity of the plurality of dissimilar question pairs and the plurality of similar question pairs in the custom vector embedding space.

15. The system of claim 11, wherein the at least one processor is further operable to:

determine a contrastive loss, a uniformity loss, and/or a density loss of the plurality of similar question pairs and the plurality of dissimilar question pairs based on the respective default vector embeddings;

wherein the custom vector embedding model is trained based on the contrastive loss, the uniformity loss, and/or the density loss.

16. The system of claim 11, wherein:

a majority of dissimilar question pairs are further apart in the custom vector embedding space of the custom vector embedding model than in a default vector embedding space of the default vector embedding model; and a majority of similar question pairs are closer together in the custom vector embedding space of the custom vector embedding model than in the default vector embedding space of the default vector embedding model.

17. The system of claim 11, wherein the at least one processor is further operable to:

define a plurality of clusters in the custom vector embedding space;

use the large language model to assign a plurality of cluster topics to the plurality of clusters, each cluster being assigned at least one cluster topic; and retrain the custom vector embedding model by adjusting at least one hyperparameter of the custom vector embedding model based on the plurality of clusters and the plurality of cluster topics.

18. The system of claim 11, wherein each synthetic variant question comprises at least one variation from the corresponding example user question, the variation comprising at least one of: a conceptual variation, an entity variation, a grammatical variation, a linguistic variation, a numerical variation, a specificity variation and/or a temporal variation.

19. The system of claim 11, wherein at least two synthetic variant questions corresponding to the same example user question relate to two different fields stored in a common database table.

20. The system of claim 11, wherein the domain-specific language comprises terminology relating to telematics and the plurality of example user questions comprise questions relating to telematics data originating from a plurality of telematics devices installed in a plurality of vehicles.

21. A non-transitory computer readable medium having instructions stored thereon executable by at least one processor to implement a method for training a custom vector embedding model, the method comprising operating the at least one processor to:

receive a plurality of example user questions containing domain-specific language;

use a large language model to create a plurality of synthetic variant questions based on the plurality of the example user questions, each synthetic variant question corresponding to an example user question;

generate a plurality of similar question pairs using the plurality of example user questions and the plurality of synthetic variant questions;

use the large language model to assign a plurality of topics to the plurality of example user questions and the plurality of synthetic variant questions, at least one topic being assigned to each example user question and each synthetic variant question;

generate a plurality of dissimilar question pairs using the plurality of example user questions, the plurality of synthetic variant questions, and the plurality of topics, each dissimilar question pair having no topics in common;

determine, using a default vector embedding model, default vector embeddings for each similar question pair and each dissimilar question pair; and train the custom vector embedding model based on differences between the default vector embeddings of each similar question pair and each dissimilar question pair, whereby the custom vector embedding model is operable to reproject default vector embeddings into a custom vector embedding space suitable for representing the domain-specific language.

* * * * *